US012585347B2

(12) United States Patent
Masumura et al.

(10) Patent No.: US 12,585,347 B2
(45) Date of Patent: Mar. 24, 2026

(54) USER INTERFACE DEVICE AND METHOD OF CONTROLLING TACTILE PRESENTATION

(71) Applicant: SHANGHAI TIANMA MICRO-ELECTRONICS CO., LTD., Shanghai (CN)

(72) Inventors: Kazunori Masumura, Kawasaki (JP); Hiroshi Haga, Kawasaki (JP); Shin Takeuchi, Kawasaki (JP); Harue Sasaki, Kawasaki (JP); Yukihiro Ito, Kawasaki (JP); Tomoki Takaya, Kawasaki (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/965,610

(22) Filed: Dec. 2, 2024

(65) Prior Publication Data
US 2025/0216960 A1 Jul. 3, 2025

(30) Foreign Application Priority Data
Dec. 27, 2023 (JP) ................................. 2023-221904

(51) Int. Cl.
G06F 3/0362 (2013.01)
G06F 3/01 (2006.01)
(52) U.S. Cl.
CPC ............ G06F 3/0362 (2013.01); G06F 3/016 (2013.01)

(58) Field of Classification Search
CPC ............................. G06F 3/0362; G06F 3/016
See application file for complete search history.

(56) References Cited

U.S. PATENT DOCUMENTS

| | | | | |
|---|---|---|---|---|
| 10,705,629 | B1 * | 7/2020 | Arnold | G06F 3/03547 |
| 2006/0155441 | A1 * | 7/2006 | Berg | B60K 35/60 |
| | | | | 701/41 |
| 2007/0279401 | A1 * | 12/2007 | Ramstein | G06F 3/016 |
| | | | | 345/184 |
| 2013/0127759 | A1 * | 5/2013 | Bae | G06F 3/041 |
| | | | | 345/173 |
| 2015/0346888 | A1 * | 12/2015 | Weyer | B60K 35/10 |
| | | | | 345/173 |
| 2018/0018027 | A1 * | 1/2018 | Kowalk | B60R 11/00 |
| 2019/0025944 | A1 | 1/2019 | Konishi et al. | |
| 2019/0198652 | A1 * | 6/2019 | Kushida | H10D 62/151 |
| 2019/0212868 | A1 * | 7/2019 | Ueno | G06F 3/041 |
| 2020/0089337 | A1 | 3/2020 | Togashi | |
| 2022/0404912 | A1 * | 12/2022 | Orita | G06F 3/0446 |

* cited by examiner

*Primary Examiner* — Ariel A Balaoing
(74) *Attorney, Agent, or Firm* — Nixon & Vanderhye

(57) ABSTRACT
A user interface device includes a knob device having a mechanical structure that presents a tactile stimulus in response to every predetermined amount of knob operation, a panel on which the knob device is mounted, a controller, and a vibration generator configured to vibrate the knob device, the vibration generator being controllable by the controller. The controller controls the vibration generator to make the knob device vibrate synchronously with the predetermined amount of knob operation for the knob device to present a tactile stimulus in addition to the tactile stimulus by the mechanical structure.

12 Claims, 15 Drawing Sheets

USER INTERFACE DEVICE

TEMPERATURE ADJUSTMENT

TOUCH SENSING
DISPLAY PANEL

USER INTERFACE DEVICE

1

AIR VOLUME ADJUSTMENT

TOUCH SENSING
DISPLAY PANEL

10

11C

Radio

Map

11A

11D

Phone

Music

11B

28°C

26°C

17

14A

14B

15

KNOB DEVICE

DIRECTION OF DISPLACEMENT
OF KNOB MOUNTING SURFACE
(LATERAL MOTION ALONG Y-AXIS)

20
FINGER

EXAMPLE OF KNOB OPERATION

USER INTERFACE DEVICE AND METHOD OF CONTROLLING TACTILE PRESENTATION

CROSS-REFERENCE TO RELATED APPLICATIONS

This non-provisional application claims priority under 35 U.S.C. § 119 (a) on Patent Application No. 2023-221904 filed in Japan on Dec. 27, 2023, the entire content of which is hereby incorporated by reference.

BACKGROUND

This disclosure relates to tactile presentation.

In recent years, touch panels have come to replace mechanical switches or buttons in various apparatuses. However, the touch panels do not have surficial unevenness like the mechanical switches or buttons; the user has to visually check the process from finding the place to be operated to finishing the operation. Although a touch panel having a tactile presentation function has been developed to address this issue, it is not versatile because its use environment is limited.

In view of the above, a device has been proposed that has multiple functions of a touch panel with a tactile presentation function while offering certainty by knob operation. Such a device is supposed to be employed for the apparatuses to be operated in parallel to other operation, such as a vehicle component to be operated while driving, a testing device for the medical field, and equipment to be used in the video/audio field.

SUMMARY

A user interface device according to an aspect of this disclosure includes a knob device having a mechanical structure that presents a tactile stimulus in response to every predetermined amount of knob operation, a panel on which the knob device is mounted, a controller, and a vibration generator configured to vibrate the knob device, the vibration generator being controllable by the controller. The controller controls the vibration generator to make the knob device vibrate synchronously with the predetermined amount of knob operation for the knob device to present a tactile stimulus in addition to the tactile stimulus by the mechanical structure.

An aspect of this disclosure is a method of controlling tactile presentation of a user interface device including a knob device having a mechanical structure that presents a tactile stimulus in response to every predetermined amount of knob operation, a panel on which the knob device is mounted, and a vibration generator configured to vibrate the knob device. The method includes controlling the vibration generator to make the knob device vibrate synchronously with the predetermined amount of knob operation for the knob device to present a tactile stimulus in addition to the tactile stimulus by the mechanical structure.

It is to be understood that both the foregoing general description and the following detailed description are exemplary and explanatory and are not restrictive of this disclosure.

EMBODIMENTS

Hereinafter, embodiments of this disclosure will be described with reference to the accompanying drawings. It should be noted that the embodiments are merely examples to implement this disclosure and not to limit the technical scope of this disclosure.

An embodiment of this disclosure applies programmable vibration to a knob device mounted on a panel and having a structure for presenting tactile stimuli to add tactile stimuli. This configuration provides variety in tactile stimuli to be presented to the user's finger operating the knob, achieving tactile augmented reality (AR).

Figure 1:
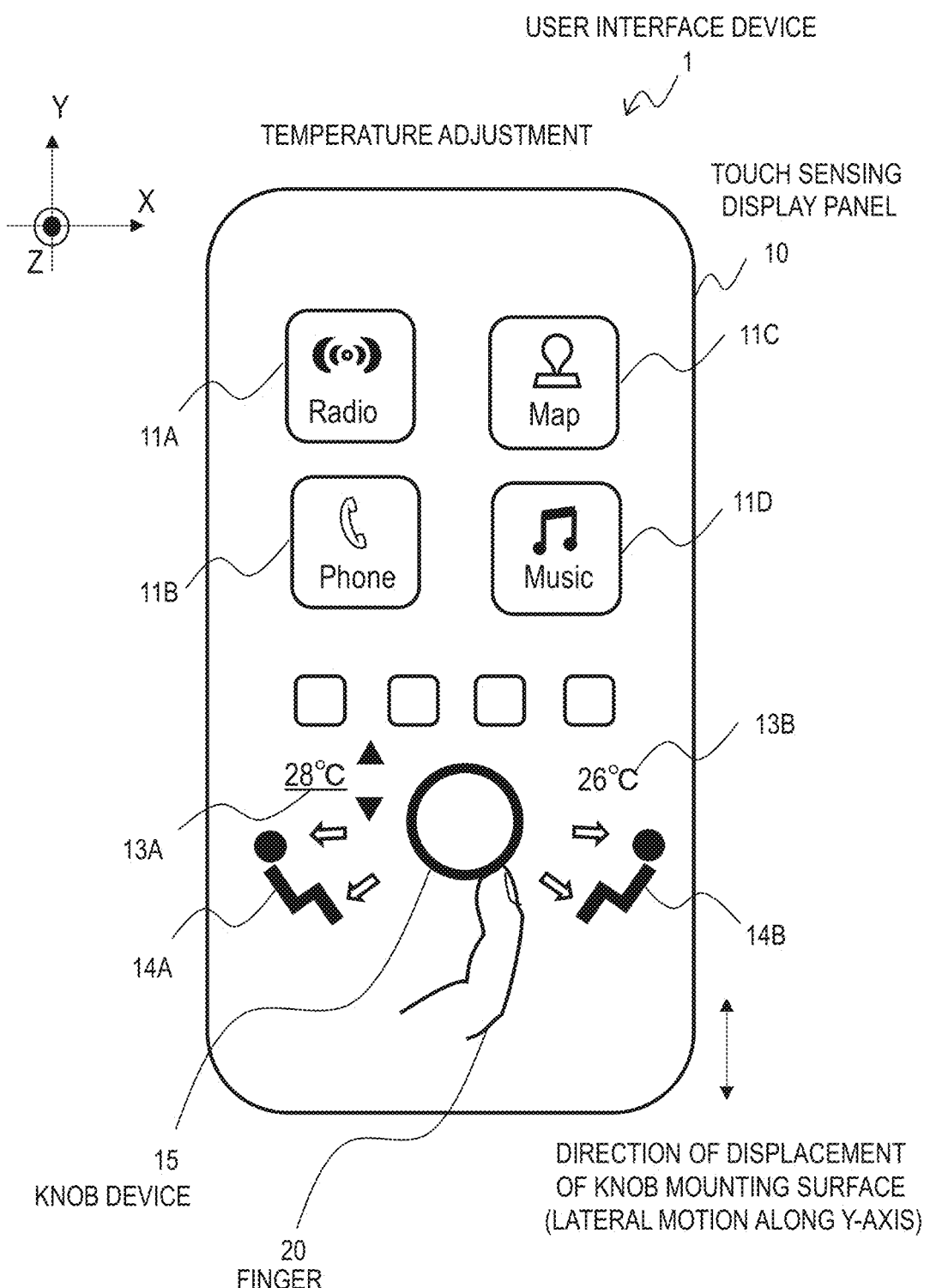
FIG. 1 illustrates a configuration example of a user interface device in an embodiment of this disclosure.

FIG. 1 illustrates a configuration example of a user interface device in an embodiment of this disclosure. The user interface device 1 can be mounted on an automotive instrument panel. The user interface device 1 in the configuration example of FIG. 1 enables the user to operate a radio, a map, a telephone, a music player, and an air conditioner. FIG. 1 depicts a state where the user is adjusting the temperature setting of the air conditioner for the left seat.

The user interface device 1 includes a touch sensing display panel 10 and a mechanical knob device 15 fixed to the touch sensing display panel 10. An example of the touch sensing display panel 10 includes a touch panel and a display panel laid one above the other. The knob device 15 is fixed on the side to be viewed (front) of the touch panel and the display panel is disposed behind the touch panel. Furthermore, a lateral actuator (not shown in FIG. 1) is fixed on the front face or back face of the touch sensing display panel 10.

In the configuration example of FIG. 1, the lateral actuator vibrates along the Y-axis. The number of actuators, the location of the actuator, the direction of vibration, and the manner of vibration are not limited as far as the actuator can present a tactile stimulus in response to a knob operation by the user. The actuator can vibrate either one or both of the position or the form of the touch sensing display panel 10 or only the knob device 15 for tactile presentation. Also, a vibration generator different from the actuator can be employed.

In FIG. 1, the horizontal axis in the plane of the sheet is the X-axis and the vertical axis in the plane of the sheet is the Y-axis. The X-axis and the Y-axis are perpendicular to each other. The Z-axis is perpendicular to the X-axis and the Y-axis; in other words, the Z-axis is perpendicular to the plane defined by the X-axis and the Y-axis. The user views the displayed image on the user interface device 1 along the Z-axis.

The touch sensing display panel 10 displays predetermined object images in response to operation by the user. The touch sensing display panel 10 in the example of FIG. 1 displays button images 11A to 11D. The images 11A to 11D correspond to buttons to select listening to the radio, talking on the phone, displaying a map, and listening to music. A tactile stimulus may or may not be presented in response to a touch to one of the button images.

The touch sensing display panel 10 further displays human images 14A and 14B on the left seat and the right seat and temperatures 13A and 13B set to the air conditioner. In response to a touch on the image of the temperature 13A or 13B, the function of temperature setting for the left seat or the right seat is assigned to the knob device 15. In the example of FIG. 1, temperature setting for the left seat is selected.

The knob device 15 includes a rotatable knob component; the user can rotate the knob component with a finger 20, for example. In the configuration example of FIG. 1, the knob component is freely rotatable clockwise and anticlockwise. In other words, the knob component can keep rotating either clockwise or anticlockwise endlessly. As will be described later, the knob device 15 has a structure that provides a tactile click at every predetermined rotation angle (unit of rotation angle).

In the example of FIG. 1, when the displayed temperature for the left seat 13A is tapped with a pointer such as a finger, the usage of setting a temperature for the left seat to the air conditioner is assigned to the knob device 15. For example, the temperature to be set changes by 1° C. per tactile click generated by the knob device 15. Anticlockwise rotation of the knob device 15 lowers the temperature by 1° C. per tactile click generated by the knob device 15 and clockwise rotation raises the temperature by 1° C. per tactile click generated by the knob device 15. The controllable temperature range is predetermined. When the knob component is kept rotating anticlockwise, the temperature stops changing at the predetermined minimum temperature. When the knob component is kept rotating clockwise, the temperature stops changing at the predetermined maximum temperature.

Figure 2:
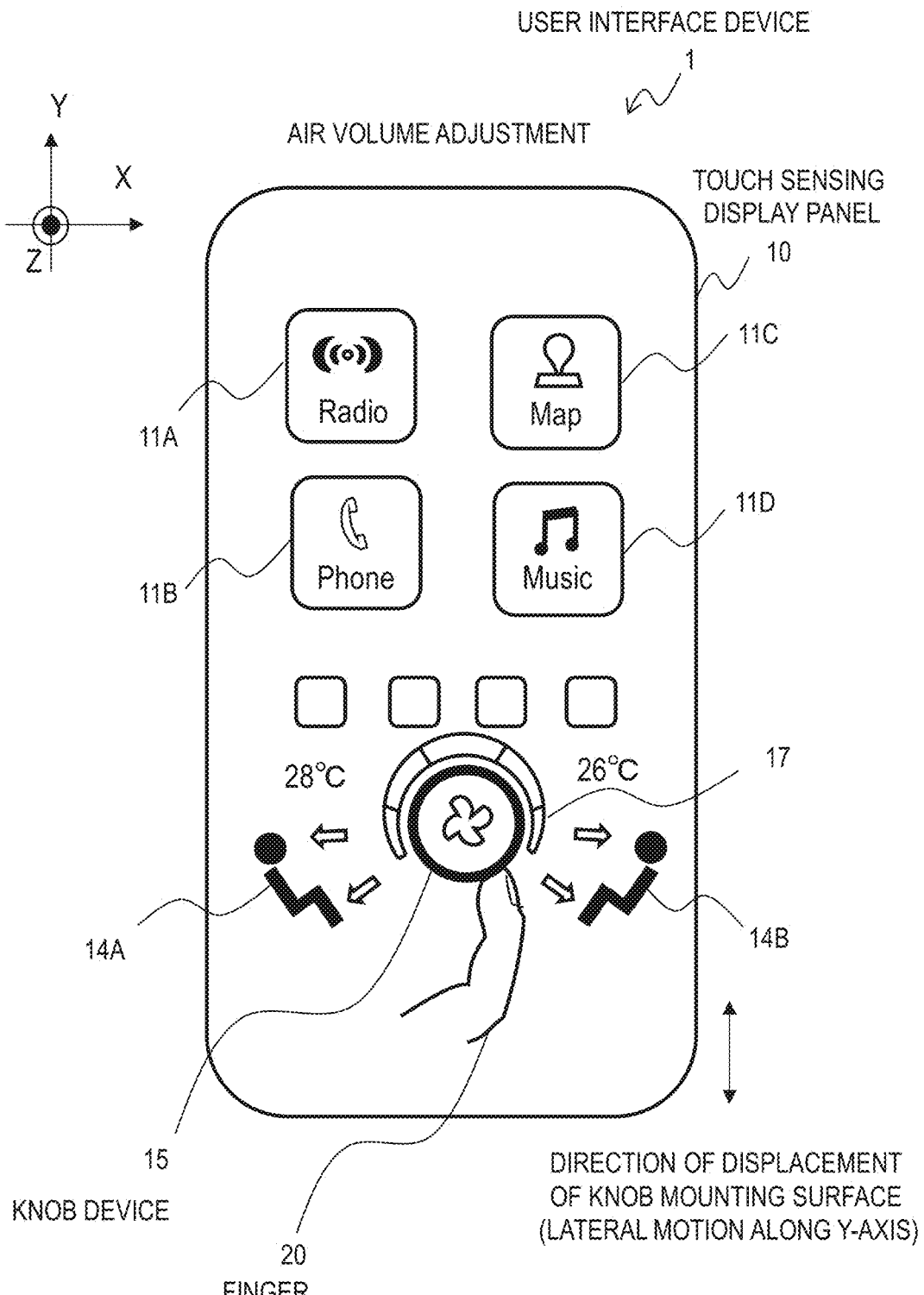
FIG. 2 schematically illustrates an example of adjusting the air volume setting of an air conditioner through the user interface device.

FIG. 2 schematically illustrates an example of adjusting the air volume setting of the air conditioner through the user interface device 1. When the left human image 14A is tapped by a pointer such as a finger, the usage of setting an air volume for the left seat to the air conditioner is assigned to the knob device 15. The object image 17 indicates the current air volume.

For example, the air volume to be set changes by one level per tactile click generated by the knob device 15. Anticlockwise rotation of the knob device 15 decreases the air volume by one level per tactile click generated by the knob device 15 and clockwise rotation increases the air volume by one level per tactile click generated by the knob device 15. The controllable air volume range is predetermined. When the knob component is kept rotating anticlockwise, the air volume stops changing at the predetermined minimum level (for example, 0). When the knob component is kept rotating clockwise, the air volume stops changing at the predetermined maximum level.

In addition to the above-described functions to operate the air conditioner, the knob device 15 would be assigned various other functions such as a function to adjust the volume in listening to music or talking on the phone and a function to select an item from a list.

Figure 3:
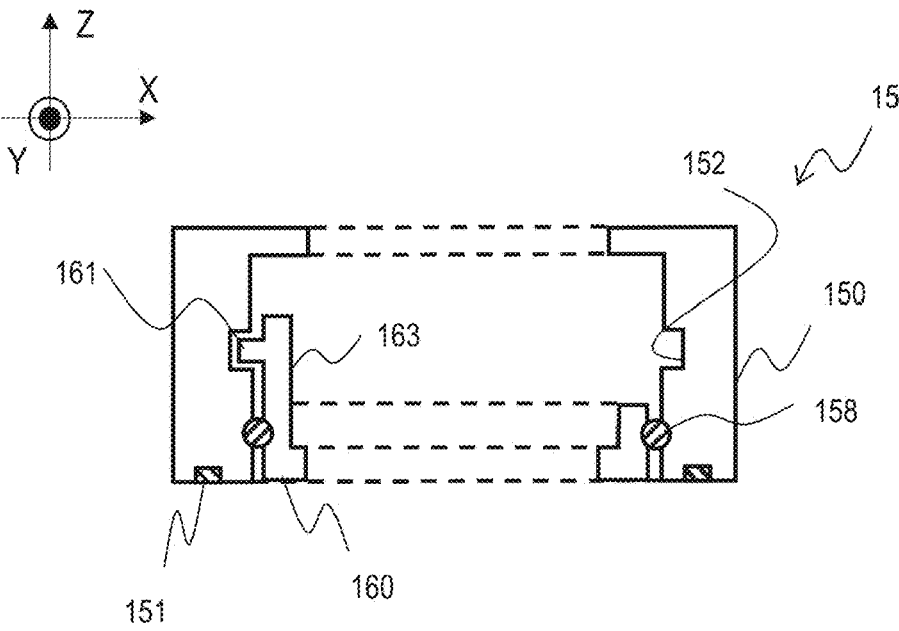
FIG. 3 schematically illustrates a configuration example of a knob device.
Figure 4:
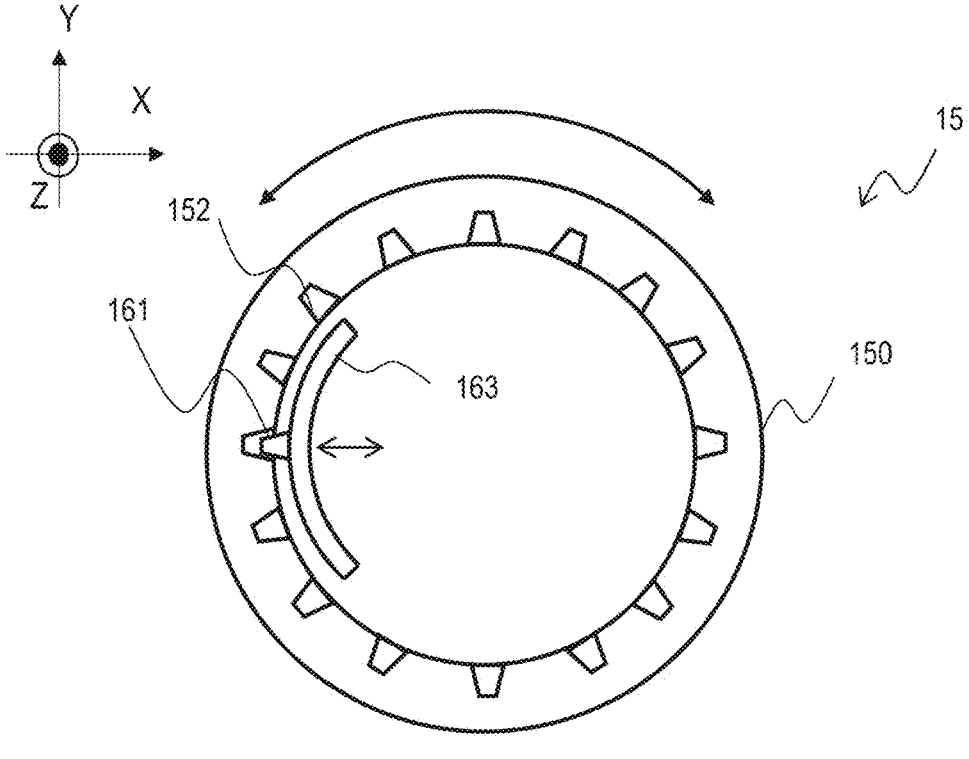
FIG. 4 schematically illustrates a configuration example of a knob device.

For a knob device to provide a tactile click with a mechanical structure, various configurations are known. FIGS. 3 and 4 schematically illustrate a configuration example of the knob device 15. Illustrated in FIGS. 3 and 4 is a configuration example of a dial type of knob device 15. FIG. 3 illustrates a cross-section of the knob device 15 viewed along the Y-axis and FIG. 4 illustrates a cross-section of a part of the knob device 15 viewed along the Z-axis.

The features of this disclosure are applicable to other types of knob devices such as a slider type of knob device. For example, a dial type of knob device 15 includes a knob component that is rotatable on a fixed base component and a slider type of knob device includes a slider knob component that is linearly slidable along a fixed base component. The slider knob component provides a mechanical tactile click (tactile stimulus) at every predetermined amount of displacement in one direction. The structure of the knob device is not limited as far as it has a mechanism for providing a tactile click. The movable range of the knob component is not particularly limited.

With reference to FIG. 3, the dial type knob device 15 includes a base component 160 and a rotary knob component 150. The base component 160 is an inner race component and the rotary knob component 150 is an outer race component. The base component 160 is fixed to the mounting surface of the touch sensing display panel 10 with an adhesive, for example. The dial type knob device 15 has a bearing structure including balls 158; however, the structure to make the knob component movable in the knob device 15 is not particularly limited.

The rotary knob component 150 includes a plurality of conductor pieces 151 circumferentially disposed to be distant from one another on its under face or the face facing the front face of the touch sensing display panel 10. The user interface device 1 can detect the positions of the conductor pieces 151 in contact with the surface of the touch sensing display panel 10.

With reference to FIG. 4, the rotary knob component 150 has a plurality of recesses 152 provided to be equally distant from one another on its inner circumferential wall. The outer circumferential end and the inner circumferential end of the rotary knob component 150 are circular. The base component 160 includes a spring member 163. The spring member 163 has a projection 161 on its outer wall or the face facing the inner wall of the rotary knob component 150. The spring member 163 has elasticity along the X-axis and presses the projection 161 against a region between recesses 152.

As the rotary knob component 150 rotates, the projection 161 gets in and out from the recesses 152 one after another to provide tactile clicks to the finger operating the rotary knob component 150. As noted from this description, the tactile click generated by the knob device 15 can be a tactile stimulus generated by storing strain energy to and releasing the strain energy from an elastic member.

The user interface device 1 detects the rotation angle of the rotary knob component 150 and controls the image to be displayed depending on the detected angle. The user interface device 1 further generates a signal for controlling other electronic component such as the air conditioner or the media player depending on the detected angle. The rotation angle of the rotary knob component 150 can be determined from the positional change of the plurality of conductor pieces 151 embedded in the rotary knob component 150.

Figure 5:
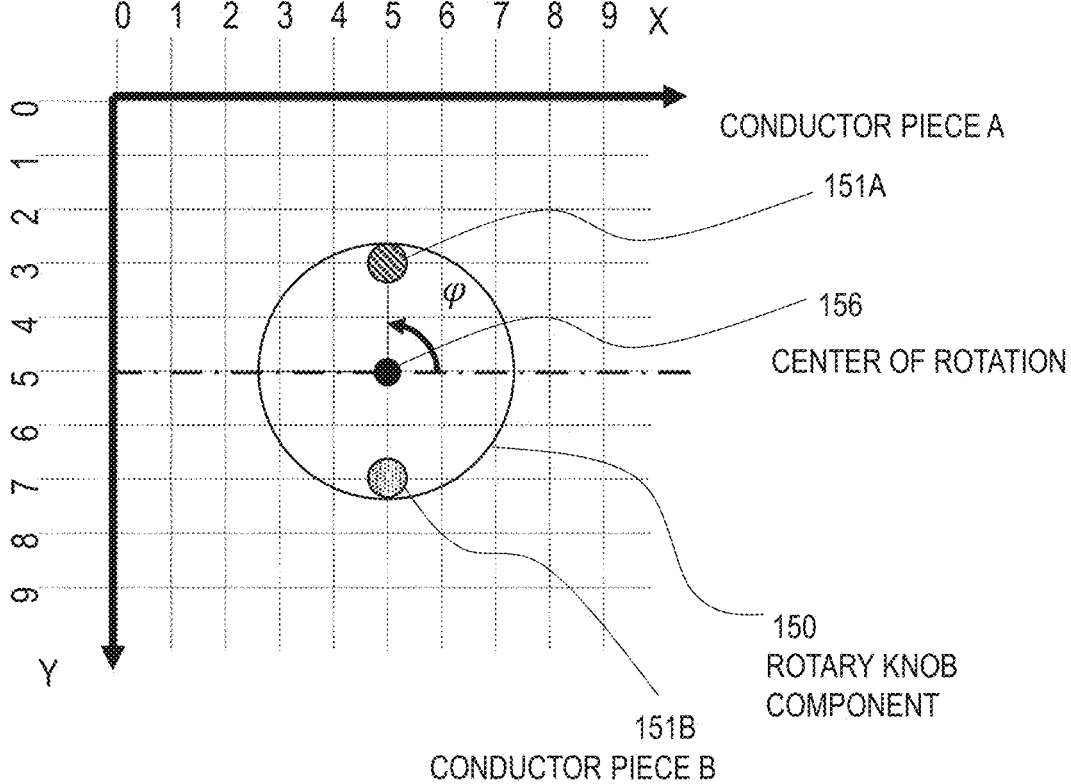
FIG. 5 is a diagram for illustrating a method of determining the rotation angle of a rotary knob component from detection points of two conductor pieces disposed on the under face of the rotary knob component.

FIG. 5 is a diagram for illustrating the method of determining the rotation angle of the rotary knob component 150 from detection points of two conductor pieces 151 disposed on the under face of the rotary knob component 150. FIG. 5 provides coordinates on the surface of the touch sensing display panel 10 and the positions of the rotary knob component 150 and its embedded conductor pieces 151 in the coordinate plane.

In the example in FIG. 5, the rotary knob component 150 includes two conductor pieces 151 of a conductor piece A 151A and a conductor piece B 151B. The conductor piece A 151A and the conductor piece B 151B are disposed to be distant from each other by 180 degrees on the circumference of the rotary knob component 150 around the center of rotation 156. The user interface device 1 determines the rotation angle of the rotary knob component 150 from the positions of the conductor piece A 151A and the conductor piece B 151B.

When the coordinates $(x_A, y_A)$ of the conductor piece A 151A and the coordinates $(x_B, y_B)$ of the conductor piece B 151B are determined by the touch sensing display panel 10, the coordinates $(x_C, y_C)$ of the center of rotation of the rotary knob component 150 can be obtained as follows:

$$(x_A, y_A) = (5, 3) \quad (x_B, y_B) = (5, 7)$$
$$x_C = \frac{(x_A + x_B)}{2} = \frac{(5+5)}{2} = 5 \quad y_C = \frac{y_A + y_B}{2} = \frac{(3+7)}{2} = 5$$

The angle $\phi$ at which the line connecting the conductor piece A 151A and the conductor piece B 151B and the horizontal line along the X-axis passing through the center of rotation intersect at the center of rotation 156 of the rotary knob component 150 can be obtained by the following formula:

$$\varphi = \text{atan2}((x_B - x_C), (y_B - y_C)) = \text{atan2}((5-5), (7-5)) = 90\,[°]$$

The rotation angle of the rotary knob component 150 can also be determined from the positions of three or more conductor pieces. Assume that the rotary knob component 150 has three conductor pieces A, B, and C, for example. These are disposed to be distant from one another on the circumference around the center of rotation of the rotary knob component 150.

Let $(X_A, Y_A)$, $(X_B, Y_B)$, and $(X_C, Y_C)$ be the initial coordinates of the conductor piece A, the conductor piece B, and the conductor piece C, respectively, and $(X_A', Y_A')$, $(X_B', Y_B')$, and $(X_C', Y_C')$ be the coordinates after rotation of the conductor piece A, the conductor piece B, and the conductor piece C, respectively. The rotation angle $\phi$ of the rotary knob component 150 can be obtained from the initial coordinates and the coordinates after rotation of the conductor pieces A, B, and C by either one of the following formulae:

$$\varphi = \text{atan2}(Y_B - Y_A, X_B - X_A) - \text{atan2}(Y_B' - Y_A', X_B' - X_A')$$
$$\varphi = \text{atan2}(Y_C - Y_A, X_C - X_A) - \text{atan2}(Y_C' - Y_A', X_C' - X_A')$$

where a $\tan 2(Y_B - YA, X_B - X_A)$ represents the angle between the line connecting the initial positions of the conductor piece A and the conductor piece B with respect to the X-axis, a $\tan 2(Y_C - Y_A, X_C - X_A)$ represents the angle of the line connecting the initial positions of the conductor piece A and the conductor piece C with respect to the X-axis, a $\tan 2(Y_B' - Y_A', X_B' - X_A')$ represents the angle of the line connecting the positions after rotation of the conductor piece A and the conductor piece B with respect to the X-axis, and a $\tan 2(Y_C' - Y_A', X_C - X_A')$ represents the angle of the line connecting the positions after rotation of the conductor piece A and the conductor piece C with respect to the X-axis. Each of the foregoing two formulae provides the rotation angle $\phi$. For example, even if one conductor piece C out of the three conductor pieces A, B, and C cannot be located for some reason and the coordinates $X_C$ and $Y_C$ are undetermined, the rotation angle $\phi$ can be obtained as long as the remaining conductor pieces A and B can be located. This rotation angle $\phi$ represents the rotation angle of the rotary knob component 150.

Using three asymmetrically disposed conductor pieces improves the accuracy in determining rotation of around 90 degrees and 270 degrees, compared to using two conductor pieces.

As described above, the method using two conductor pieces estimates the rotation angle from the inclination of a line connecting two points. The method using three conductor pieces estimates the rotation angle from the inclinations of two lines connecting two of the three points. The method using three conductor pieces is expected to achieve higher accuracy than the method using two conductor pieces because more information can be used to estimate the rotation angle.

More specifically, increase in the number of lines means increase in clue, which increases the accuracy. And desirably, the three conductor pieces are to be disposed at the apexes of a non-regular triangle instead of symmetric locations such as the apexes of a regular triangle. Compared to symmetric disposition, asymmetric disposition makes the difference in distance between two lines clear, facilitating detection of a change in relative position.

To estimate the rotation angle, the user interface device 1 identifies each of the conductor pieces and detects their positions. For example, the user interface device 1 assigns IDs to the conductor pieces and determines their initial positions in the initial settings. The user interface device 1 traces the positions of the identified conductor pieces to determine their current positions. A widely known multitouch detection function can be applied to locating the conductor pieces.

In the meanwhile, the rotation angle for the mechanical structure to present the next tactile click can be calculated from the current positions of the plurality of conductor pieces by determining the positional relations of the plurality of conductor pieces in the rotary knob component 150 in advance. For example, the positional relation among the projection 161, the plurality of recesses 152, and the plurality of conductor pieces 151 shown in FIG. 4 is predetermined. Identification of individual conductor pieces can be made by detecting touch waveforms unique to the conductor pieces with one or more of the conductor pieces.

Hereinafter, a tactile presentation method of the user interface device 1 is described. The user interface device 1 in an embodiment of this specification achieves variety in tactile feedback to be provided to the user by applying programmable vibration to the rotary knob component 150, in addition to mechanical tactile clicks presented by the knob device 15. The configuration example described in the following provides the user with tactile feedback through the rotary knob component 150 by making an actuator vibrate the touch sensing display panel 10 but the way to add tactile stimuli is not particularly limited.

Figure 6:
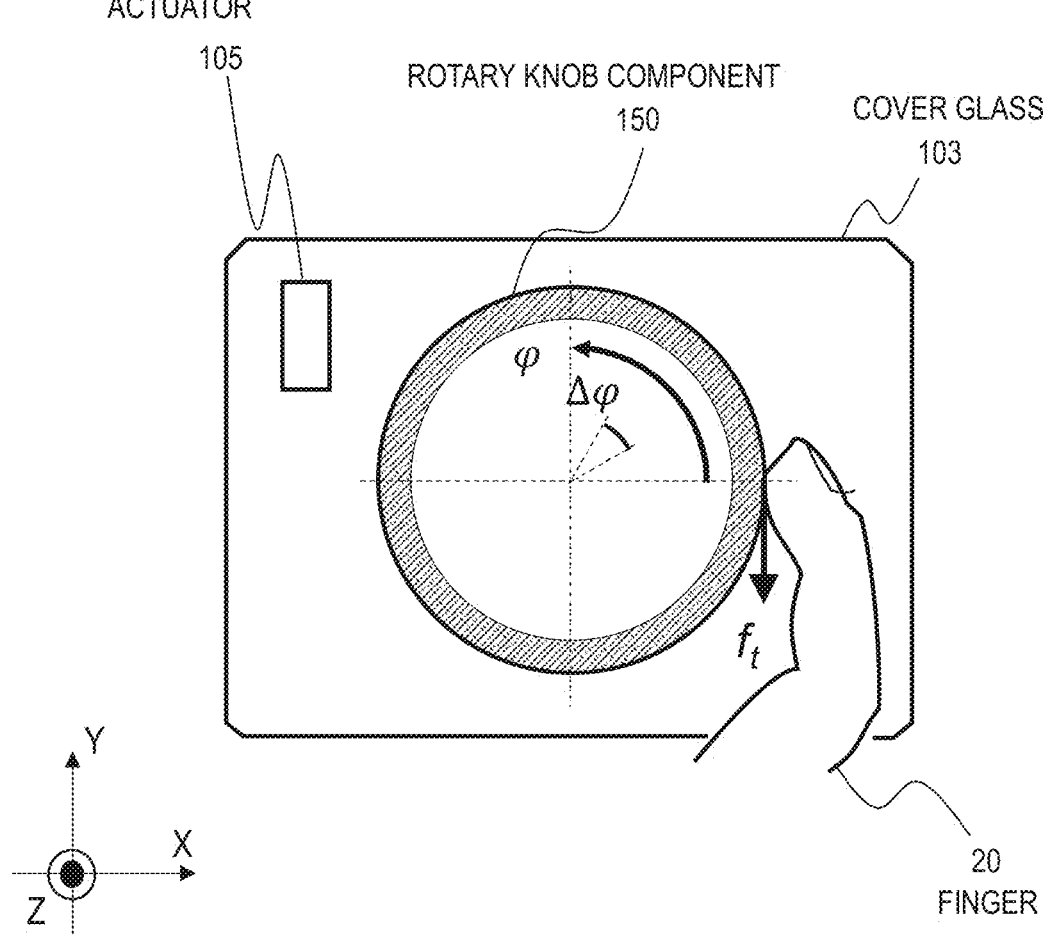
FIG. 6 schematically illustrates a configuration example of a part of a user interface device.

FIG. 6 schematically illustrates a configuration example of a part of a user interface device 1. The user interface device 1 includes a cover glass 103 of the touch sensing display panel 10 and a knob device 15 mounted on the surface of the cover glass 103. FIG. 6 shows the rotary knob component 150 of the knob device 15. The surface of the cover glass 103 is the mounting surface of the knob device 15. An actuator 105 is attached on the surface of the cover glass 103 opposite the mounting surface of the knob device 15. The actuator 105 vibrates in the direction normal to the mounting surface of the knob device 15 or a direction within the plane, for example.

The user interface device 1 in an embodiment of this specification vibrates the cover glass 103 on which the knob device 15 is mounted with an electrically controllable actuator 105 to superimpose the electrically controllable vibration of the knob device 15 onto the mechanical vibration (a tactile click) of the knob device 15. The user interface device 1 attains variety of tactile feedback to the user by synchronizing the programmable vibration applied from the external with the mechanical vibration of the knob device 15 and achieves tactile augmented reality (AR).

The knob device 15 in an embodiment of this specification presents cyclic tactile stimuli (tactile clicks presented by its mechanical structure) as the rotary knob component 150 rotates. Specifically, when the rotary knob component 150 rotates by a predetermined angle from the position where the last tactile click is presented, it presents the next tactile click. Each angle Δφ between adjacent positions to present a tactile click (the amounts of rotation) is uniform, although the angle Δφ does not need to be uniform.

The user interface device 1 controls the actuator 105 to vibrate synchronously with the cyclic vibration (repetitive tactile clicks) generated by the structure of the knob device 15. Since the tactile clicks automatically provided by the knob device 15 are generated by the mechanical structure of the knob device 15, they cannot be programmed electrically. However, since the programmable vibration from the external is synchronized with the tactile clicks, the user feels as if the sensation by tactile clicks changed seamlessly.

A tactile click generated by the mechanical structure of the knob device 15 changes the shear force ft in the direction of rotation acting on the fingertip. The programmable vibration to be applied from the external is vibration in the direction normal to the surface on which the knob device 15 is mounted or a direction within its plane, for example. In FIG. 6, the normal direction is the Z-axis direction.

The Pacinian corpuscle of a mechanoreceptor for detecting vibration cannot discriminate directions of vibration and accordingly, the user feels as if the shearing force ft in the direction of rotation acting on the fingertip had changed. Hence, the user interface device 1 can make the user feel as if the tactile clicks generated by the mechanical structure of the knob device 15 had changed.

The rotary knob component 150 in an embodiment of this specification is designed to be able to rotate endlessly without stopping. This configuration allows diversification of the usage. For example, the user interface device 1 may apply programmable external vibration synchronously with vibration of the mechanical structure when the temperature setting has reached the upper limit. Then, the user will know the fact without feeling uncomfortable even though the user does not look at the user interface device 1.

The rotary knob component 150 can be supplied with electrically controllable vibration through a means different from the actuator 105. For example, the reaction force supplied from an electrode in the touch sensing display panel 10 to a conductor piece of the rotary knob component 150 can be controlled by controlling a signal to be supplied to the electrode. Like this example, various vibration generators can apply programmable vibration to the rotary knob component 150.

Figure 7:
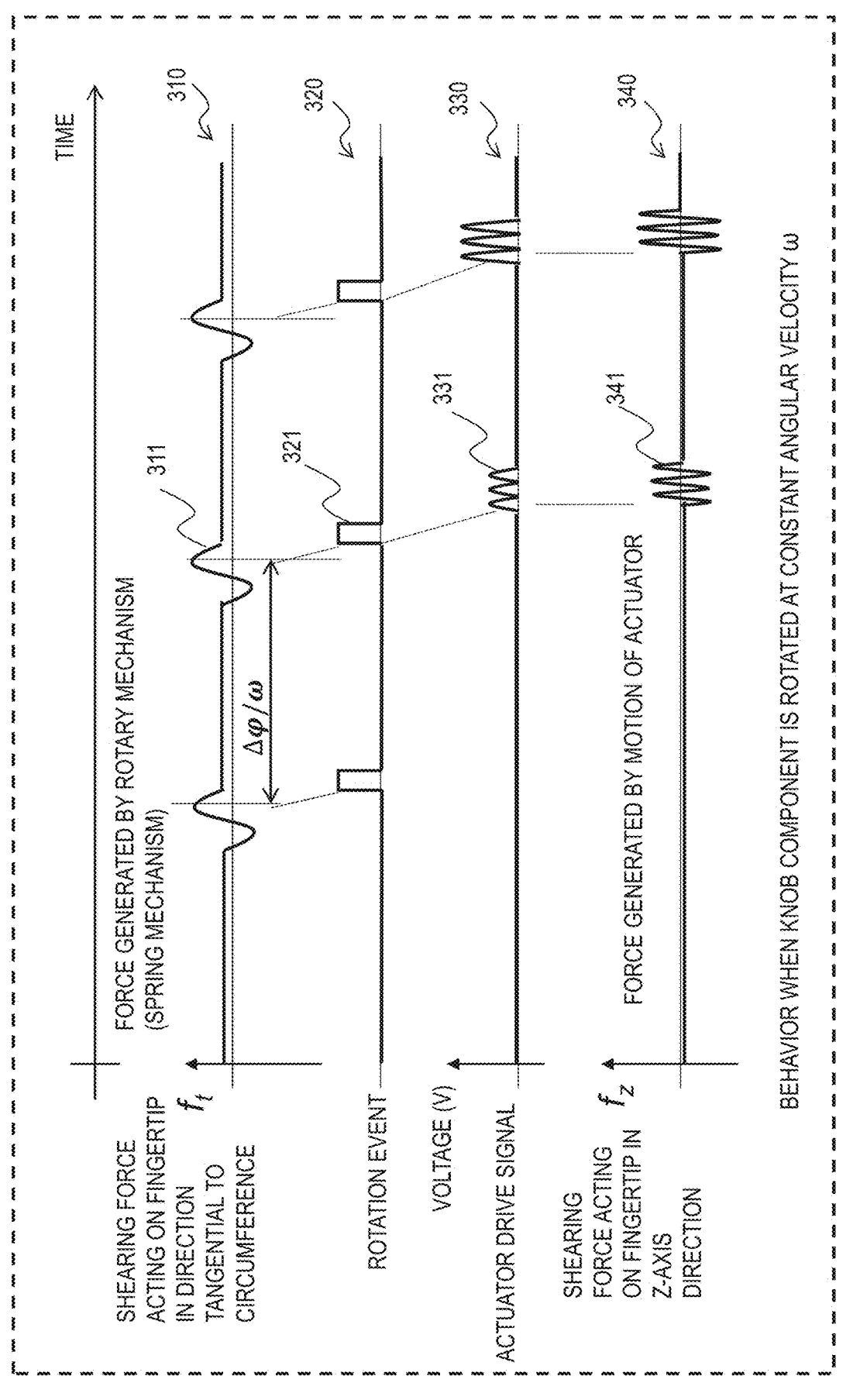
FIG. 7 is a diagram for illustrating an example of the behavior of the user interface device when the rotary knob component is rotated at a constant angular velocity ω.

FIG. 7 is a diagram for illustrating an example of the behavior of the user interface device 1 when the rotary knob component 150 is rotated at a constant angular velocity ω. The graph 310 represents temporal variation of the shearing force ft in a direction tangential to the circumference that is caused by the mechanical vibration generated by the rotation of the rotary knob component 150 at the angular velocity ω and acting on the fingertip. The cyclically appearing pulses 311 indicate that a shearing force ft larger than 0 acts on the fingertip cyclically. The shearing force ft is generated at every rotation of the rotary knob component 150 by Δφ. The width of a pulse 311 with respect to the rotation angle (the pulse width with respect to the horizontal axis representing the rotation angle) is smaller than Δφ. Each pulse 311 in FIG. 7 consists of one cycle of sine wave.

The graph 320 represents the rotation detection signal output in the user interface device 1 in response to rotation of the rotary knob component 150 in the amount of rotation Δφ to cause a cyclic tactile stimulus. The amount of rotation Δφ is predetermined. Each of the cyclically appearing rectangular pulses 321 represents an event of occurrence of a mechanical tactile click. In the example of FIG. 7, the user interface device 1 generates an event pulse 321 at every rotation of the rotary knob component 150 by Δφ detected with the conductor pieces 151.

In the example of FIG. 7, the intervals between consecutive pulses 321 are equal to the intervals between pulses 311 of the rotary knob component 150 and the intervals between a click pulse 311 and the immediately following event pulse 321 are uniform. The pulses 311 and the pulses 321 are the same in frequency but different in phase.

The graph 330 represents the drive signal supplied to the actuator 105. The user interface device 1 supplies a drive pulse (drive voltage pulse) 331 to the actuator 105 in response to an event pulse 321 of the rotation detection signal. In response, the actuator 105 vibrates for a short period. A drive pulse 331 in the example of FIG. 7 consists of a plurality of successive isolated sine waves (sine wave pulses). Compared to a common angular velocity of the rotary knob component 150 rotated by the user, the period (pulse width) of the drive pulse 331 is much short.

The graph 340 represents temporal variation of the shearing force fz in the Z-axis direction that is caused by the vibration of the actuator 105 and acting on the fingertip. A vibration pulse 341 corresponds to the shearing force applied to the finger by tactile stimuli presented at one time. The period of the vibration pulse 341 is the period for which the actuator 105 vibrates and it is substantially equal to the period of the drive pulse 331.

As illustrated in FIG. 7, the user interface device 1 vibrates the rotary knob component 150 with the vibration of the actuator 105 in such a manner that the vibration of the actuator 105 is synchronized with the cyclic tactile clicks (tactile stimuli) generated by the mechanical structure of the knob device 15. In the example in FIG. 7, the angular cycle of the rotation event pulse 321 is equal to the angular cycle Δφ of the tactile click by the mechanical structure of the knob device 15. This means that the angular cycle of the tactile presentation by vibration of the actuator 105 is equal to the angular cycle Δφ of the tactile click by the mechanical structure of the knob device 15.

The manner of synchronization of rotation event pulses 321 with vibration pulses 311 by the mechanical tactile clicks of the knob device 15 is not limited to the foregoing example. The angular cycle of the rotation event pulse 321 can be an integral multiple or an integral fraction of the angular cycle Δφ of the mechanical vibration pulse 311 of the knob device 15. For example, the angular cycle of the rotation event pulse 321 can be Δφ/2 or 2*Δφ. Furthermore, the phase difference between the vibration pulse 311 and the rotation event pulse 321 is not limited.

Figure 8:
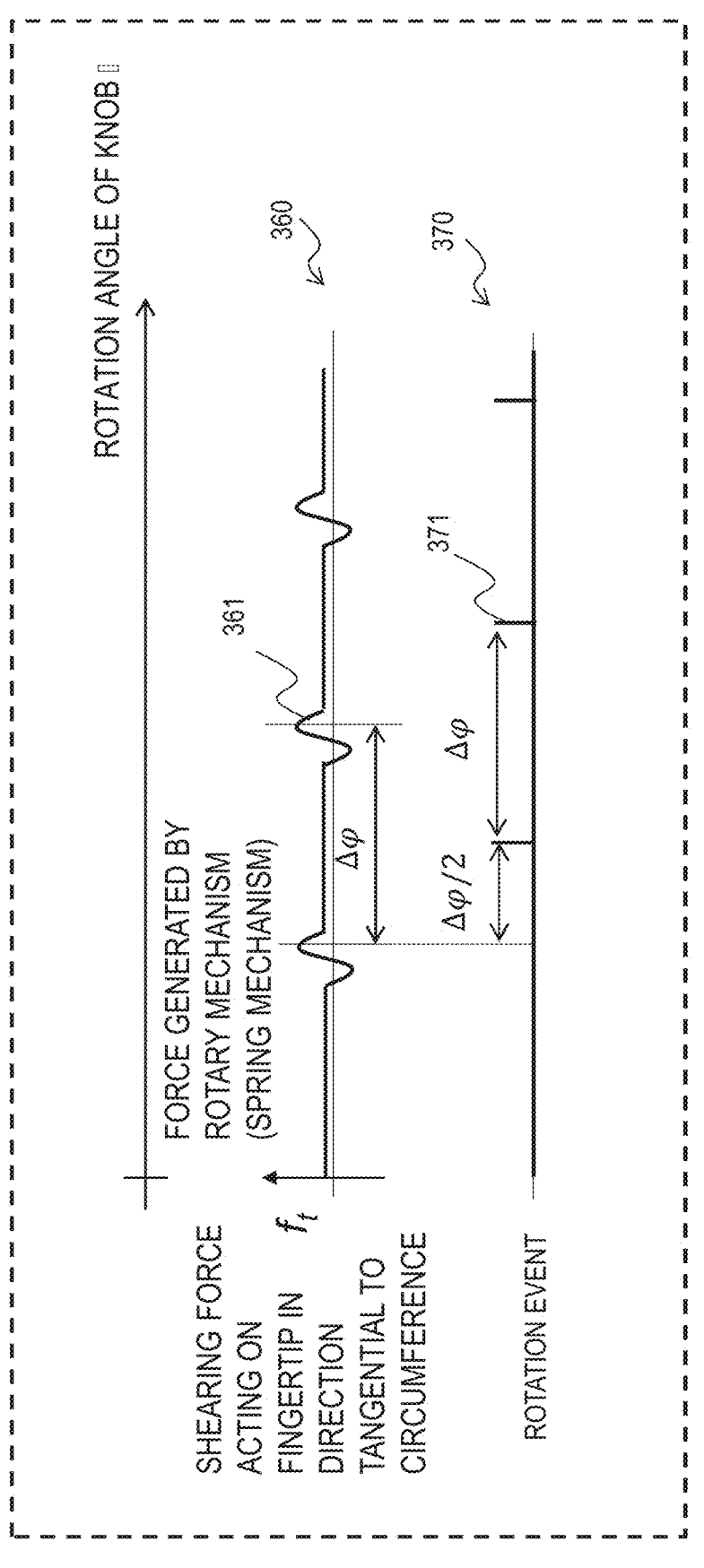
FIG. 8 illustrates an example of the relation between a mechanical vibration pulse and a rotation event pulse in the knob device.

FIG. 8 illustrates an example of the relation between the mechanical vibration pulse 311 of the knob device 15 and the rotation event pulse 321. The graph 360 represents the relation between the angle of the rotary knob component 150 and the shearing force ft in the direction tangential to the circumference that is generated by the mechanical vibration and acting on the fingertip. The horizontal axis represents the angle of the rotary knob component 150 and the vertical axis represents the shearing force ft. The cyclically appearing pulses 361 indicate that a shearing force ft larger than 0 acts on the finger cyclically. The shearing force ft is generated at every rotation of the rotary knob component 150 by Δφ. The amount of rotation Δφ is predetermined.

The graph 370 represents the rotation detection signal output in the user interface device 1 in response to rotation of the rotary knob component 150 in the amount of rotation Δφ. The cyclically appearing pulses 371 indicate events of occurrence of a mechanical tactile click. The horizontal axis represents the angle of the rotary knob component 150 and the vertical axis represents the magnitude of the event pulse 371.

In the example in FIG. 8, the user interface device 1 controls the rotation angle cycle Δφ for the event pulse 371. The user interface device 1 can calculate the angles from the current position to the positions where the next mechanical tactile click will be generated in both cases of clockwise and anticlockwise rotation of the rotary knob component 150 from the coordinates of the plurality of conductor pieces 151.

In the example in FIG. 8, the rotation angle cycle Δφ1 for the event pulse 371 is equal to the rotation angle cycle Δφ of the tactile click of the rotary knob component 150. The user interface device 1 generates an event pulse 371 at every rotation of the rotary knob component 150 in the amount of Δφ that is detected based on the positions of the plurality of conductor pieces 151. The rotation angle cycle Δφ1 for the event pulse 371 is determined to be synchronized with the rotation angle cycle Δφ of the tactile click of the rotary knob component 150; the value of Δφ1 is an integral multiple or an integral fraction of Δφ.

In the example in FIG. 8, the phase difference between the angle at which the rotary knob component 150 provides a tactile click and the angle to generate a rotation event pulse 371 is 180 degrees. That is to say, generation of an event pulse 371 is delayed from the last mechanical tactile click by Δφ/2. This configuration naturally changes the tactile stimuli to be presented to the user. The phase difference is not limited to 180 degrees. For example, the phase difference can be in the range of 180°±90° or 180°±180°. The same description applies to the phase difference between the angle at which the rotary knob component 150 provides a tactile click and the angle to generate an actuator drive pulse.

Figure 9:
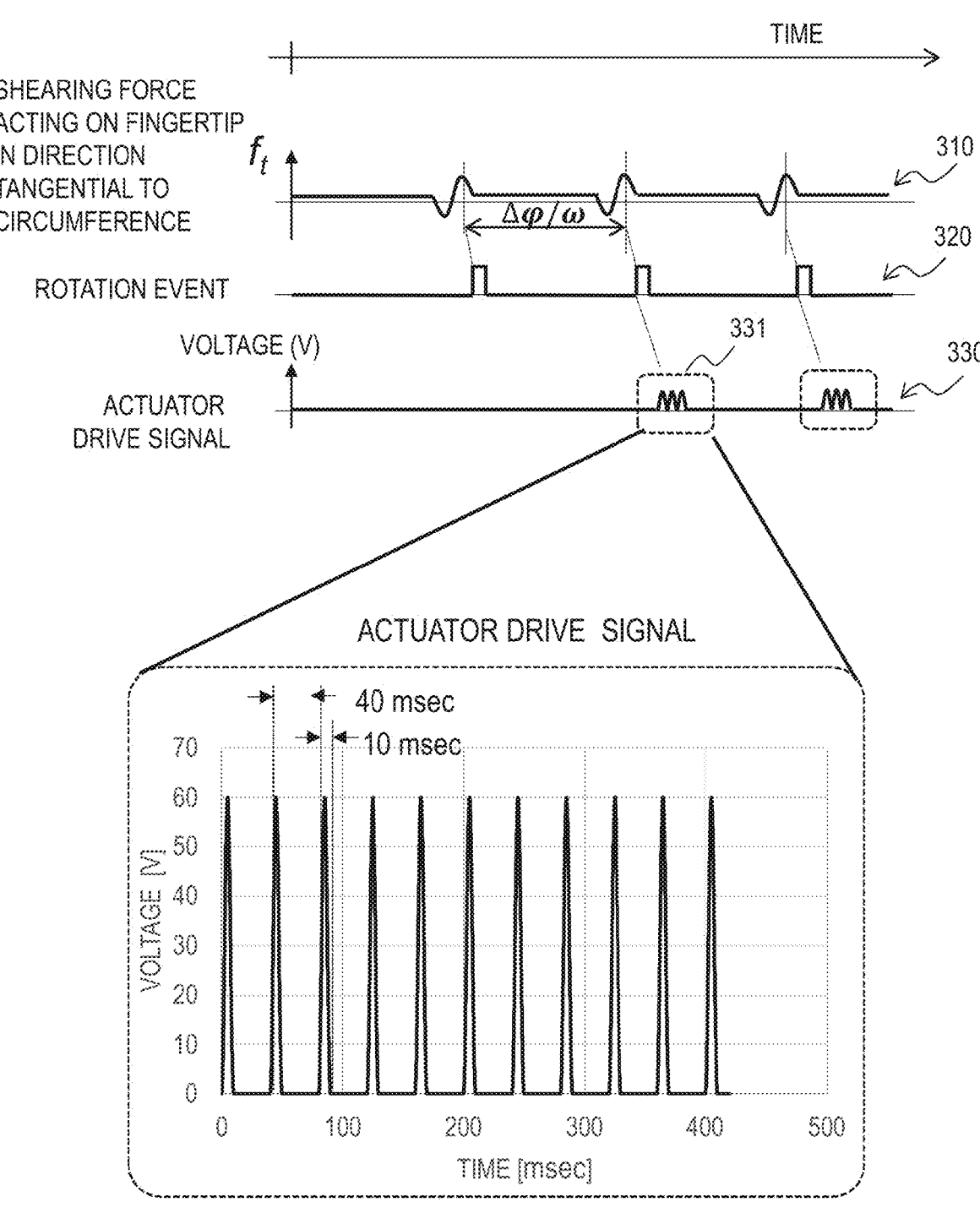
FIG. 9 illustrates an example of an actuator drive signal.

FIG. 9 illustrates an example of the drive signal for the actuator 105. An example of the actuator 105 is a piezo (PZT) actuator. For example, when the value to be set, such as the temperature or the air volume of the air conditioner or the sound volume, has reached a limit (the maximum value or the minimum value) of the predetermined range in accordance with operation of rotating the rotary knob component 150 but the rotary knob component 150 is rotated more, the user interface device 1 supplies a drive voltage to the actuator 105 to make the actuator 105 start vibrating. As a result, the user can know that the value being set has reached a limit without looking at the display on the user interface device 1.

With reference to FIG. 9, the graph 310 represents temporal variation of the shearing force ft in a direction tangential to the circumference that is caused by the mechanical vibration generated by the rotation of the rotary knob component 150 at the angular velocity ω and acting on the fingertip. The graph 320 represents the rotation detection signal output in the user interface device 1 in response to rotation of the rotary knob component 150 in the amount of rotation Δφ to cause a cyclic tactile stimulus. The graph 330 represents the drive signal to be supplied to the actuator 105. These have been described with reference to FIG. 7.

A drive pulse 331 consists of a plurality of successive isolated sine waves, specifically, eleven isolated sine waves with a cycle of 40 msec. The pulse width of each isolated sine wave (pulse) is 10 msec and the pulse voltage is 60 V. The plurality of isolated sine waves provide the user with appropriate tactile stimuli. There is a period of no vibration between two consecutive drive pulses 331 and the two consecutive drive pulses 331 are intermissive.

Figure 10:
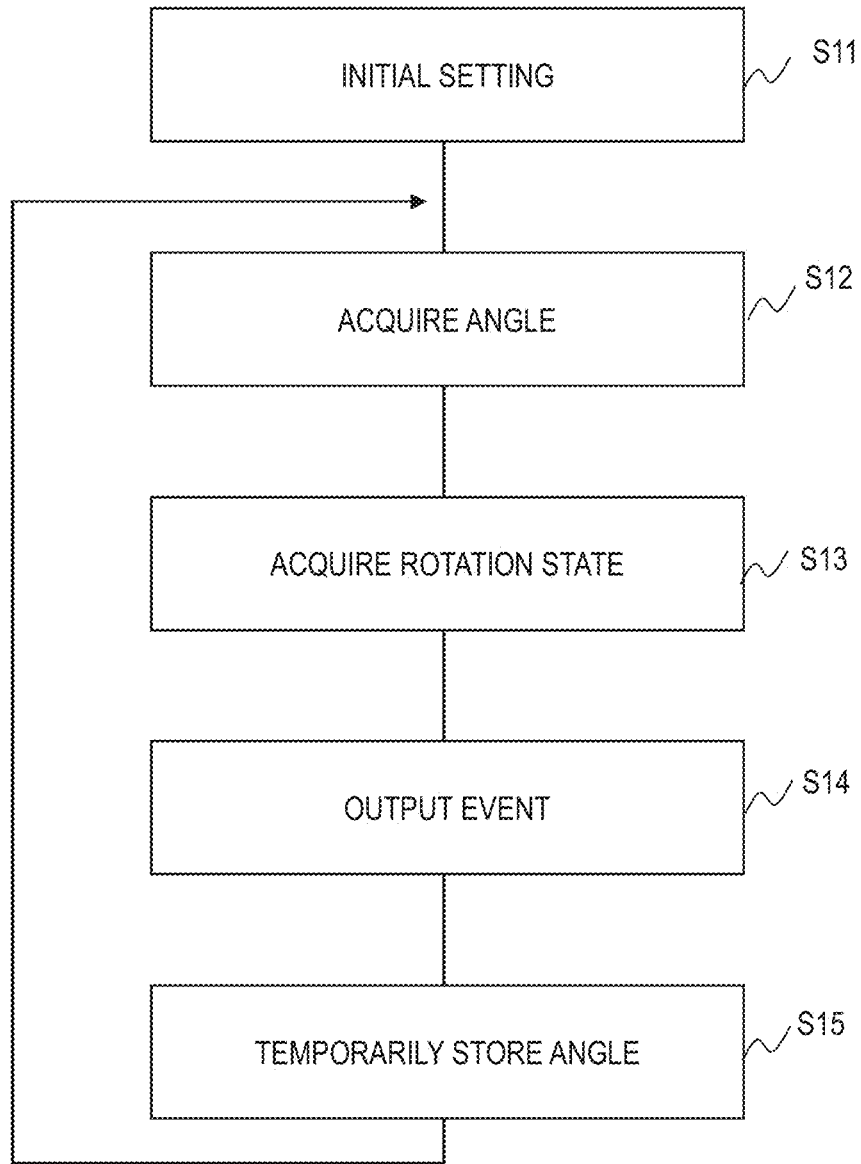
FIG. 10 is a flowchart of an example of the processing of the user interface device.

FIG. 10 is a flowchart of an example of the processing of the user interface device 1. First, the user interface device 1 executes an initial setting step (S11). Specifically, the user interface device 1 acquires a predefined array of angles Θ[ ] at which a tactile click is to be generated by the structure of the knob device 15. The user interface device 1 clears the previously acquired angle φn−1 of the rotary knob component 150 into 0. The user interface device 1 sets a state "undetermined" to the state S indicating the current state of the rotary knob component 150.

Next, the user interface device 1 executes an angle acquisition step (S12). Specifically, the user interface device 1 acquires the current rotation angle φn of the rotary knob component 150. The rotation angle φn is calculated from the positions of the plurality of conductor pieces 151.

Next, the user interface device 1 executes a rotation state acquisition step (S13). Specifically, the user interface device 1 calculates the difference between φn and φn−1 and changes the current state S based on the value of the difference as follows: if the difference is 0, the user interface device 1 changes the state S to "stopped"; if the difference is a positive value, the user interface device 1 changes the state S to "rotating positively"; and if the difference is a negative value, the user interface device 1 changes the state S to "rotating negatively".

Next, the user interface device 1 executes an event output step (S14). Specifically, if the state S is "stopped", the user interface device 1 does nothing; if the state S is other than "stopped", the user interface device 1 searches the array of angles Θ[ ] for the acquired rotation angle ϕn of the rotary knob component 150. If there is a match, the user interface device 1 outputs an event of occurrence of a tactile click by the structure of the knob device 15.

Next, the user interface device 1 executes an angle temporary storing step (S15). Specifically, the user interface device 1 substitutes the current rotation angle ϕn to the previously acquired angle ϕn−1. Thereafter, the user interface device 1 returns to Step S12.

Figure 11:
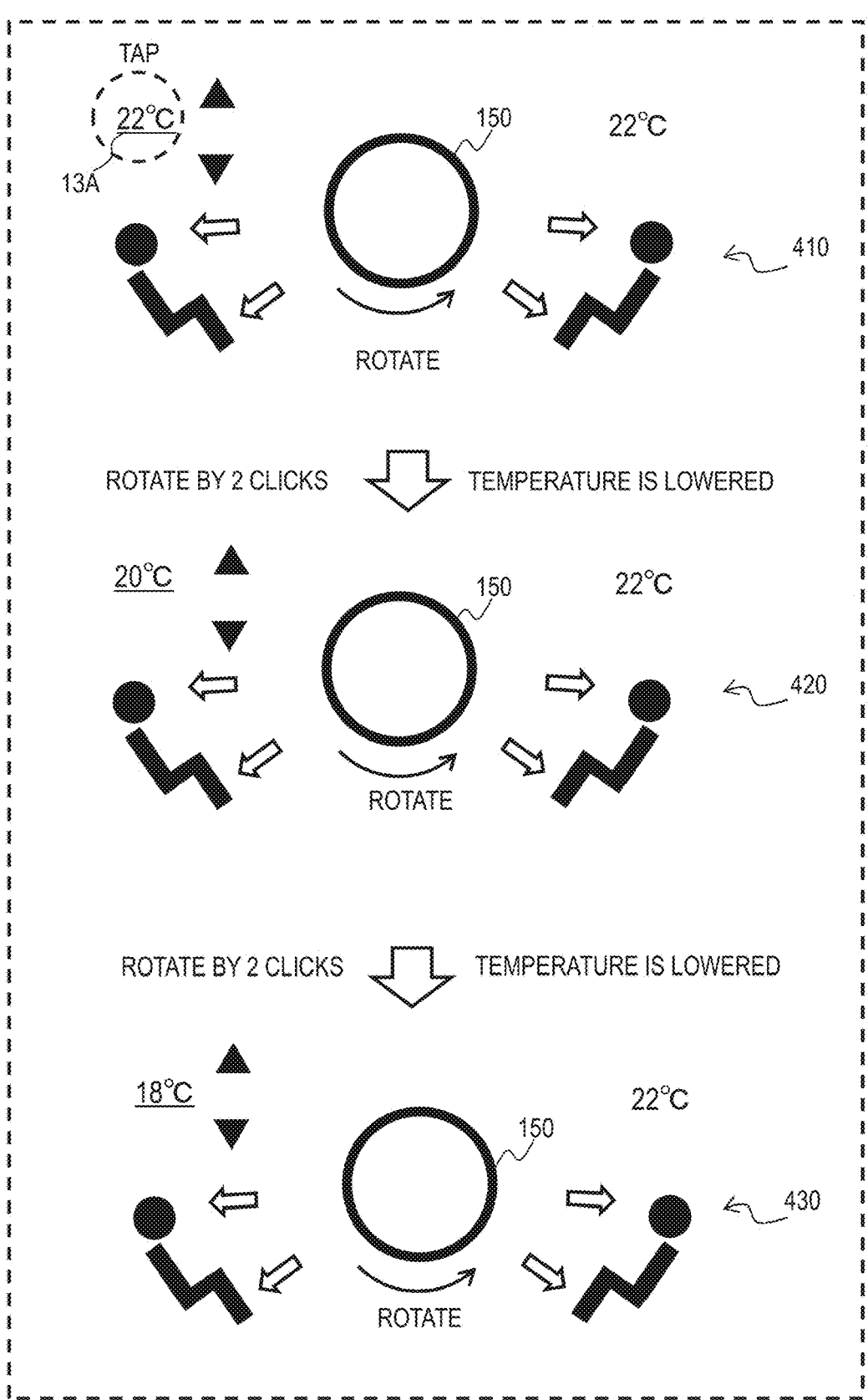
FIG. 11 illustrates operation to adjust the temperature setting of an air conditioner through the user interface device and resultant changes of the image displayed on the user interface device.

Hereinafter, an example of adjusting temperature setting of an air conditioner is described. FIG. 11 illustrates operation to adjust the temperature setting of an air conditioner through the user interface device 1 and resultant changes of the image displayed on the user interface device 1. The user interface device 1 is configured to change the temperature setting by 1° C. when the knob device 15 generates one mechanical tactile click. Clockwise (rightward) rotation of the rotary knob component 150 raises the temperature and anticlockwise (leftward) rotation lowers the temperature.

When the user taps the displayed temperature 13A for the left seat in the state 410 in FIG. 11, the knob device 15 is assigned a usage of adjusting the temperature setting of the air conditioner. For example, the user rotates the rotary knob component 150 anticlockwise. The user interface device 1 lowers the temperature setting by 1° C. when the knob device 15 generates one mechanical tactile click. The current temperature setting for the left seat is 22° C.; anticlockwise rotation that generates two tactile clicks lowers the temperature setting by 2° C. The state 420 depicts the state where the temperature setting for the left seat is lowered to 20° C.

The user further rotates the rotary knob component 150 anticlockwise from the state 420 where the temperature setting for the left seat is 20° C. The state of the user interface device 1 changes into the state 430 where the temperature setting for the left seat is lowered to 18° C.

Assume that the user further rotates the rotary knob component 150 anticlockwise after the temperature for the left seat is set at 18° C. The user interface device 1 drives the actuator 105 synchronously with a tactile click generated by the structure of the knob device 15. The unique tactile stimulus obtained by adding (superimposing) the tactile stimulus by the actuator 105 onto the tactile stimulus by the structure makes the user perceive that the temperature setting has reached the lower limit. The temperature setting for the left seat is maintained at 18° C.

For example, when the user rotates the rotary knob component 150 clockwise by one tactile click after perceiving the unique tactile stimulus, the temperature changes from 18° C. to 19° C. At this event, the vibration by the actuator 105 is not added. The user who knows that the temperature setting to cause the unique tactile stimulus is 18° C. can set a desired temperature without looking at the screen of the user interface device 1 based on the number of tactile clicks counted in rotating the knob clockwise.

Figure 12:
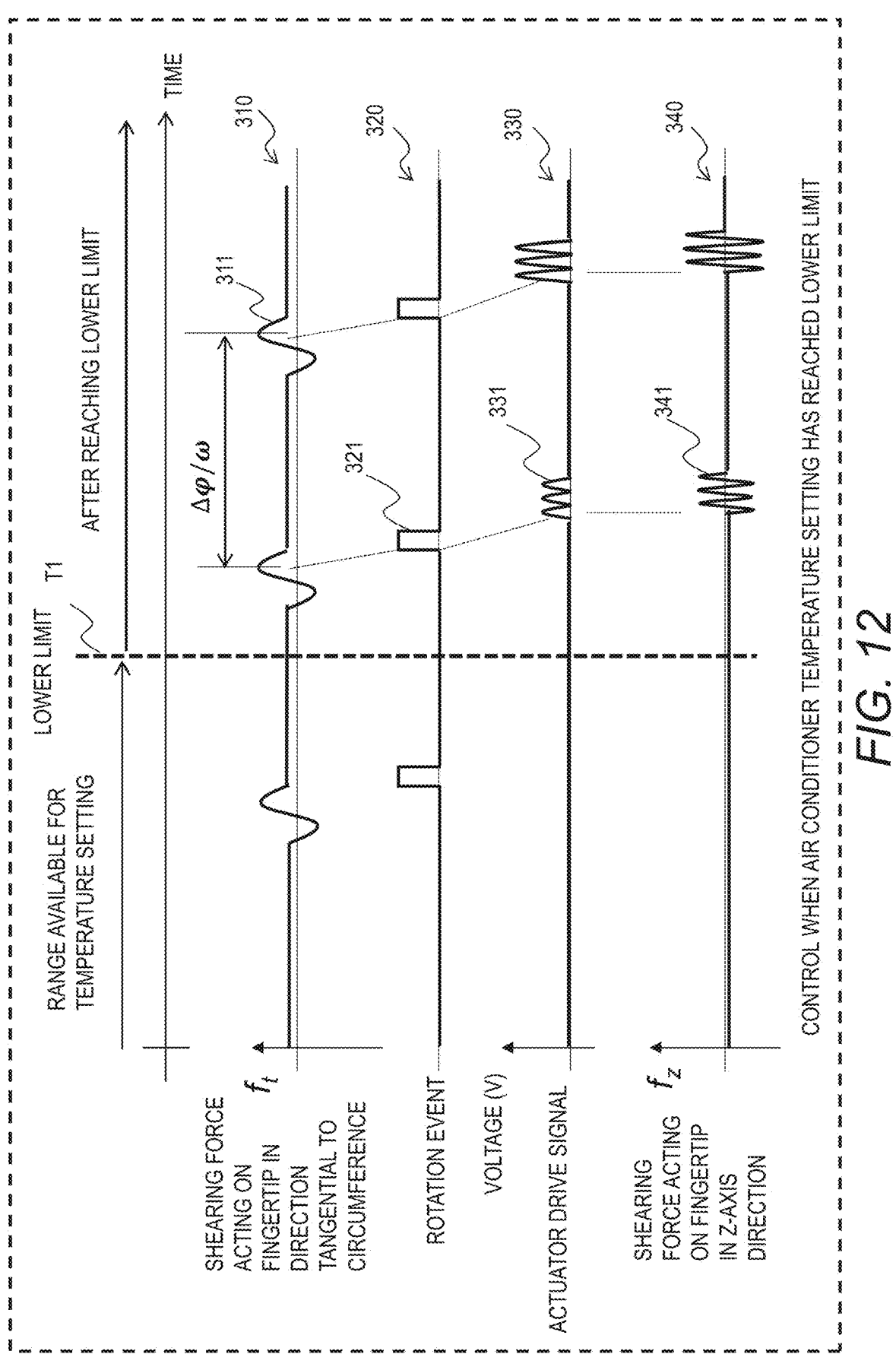
FIG. 12 is a diagram for explaining the behavior of the user interface device described with reference to FIG. 11.

FIG. 12 is a diagram for explaining the behavior of the user interface device 1 described with reference to FIG. 11.

Like the example described with reference to FIG. 7, it is assumed that the user rotates the rotary knob component 150 anticlockwise at a constant angular velocity ω. Although it is assumed that the rotary knob component 150 is rotated at a constant angular velocity ω for convenience of explanation, the actual angular velocity can take any value.

The graph 310 represents temporal variation of the shearing force ft in a direction tangential to the circumference that is caused by the mechanical vibration generated by the rotation of the rotary knob component 150 at the angular velocity ω and acting on the fingertip. The graph 320 represents the rotation detection signal output in the user interface device 1 in response to rotation of the rotary knob component 150 in the amount of rotation Δϕ to cause a cyclic tactile stimulus. The graph 330 represents the drive signal to be supplied to the actuator 105. The graph 340 represents the shearing force in the Z-axis direction that is caused by the movement of the actuator 105 and acting on the fingertip. These have been described with reference to FIG. 7.

The user interface device 1 monitors the angular position of the rotary knob component 150 based on the positions of the plurality of conductor pieces 151 of the rotary knob component 150. When the rotary knob component 150 rotates anticlockwise by Δϕ after the last time the temperature setting is lowered, the user interface device 1 lowers the temperature setting for the left seat by 1° C. Unless the temperature setting reaches the lower limit, the user interface device 1 keeps the actuator 105 not to vibrate. That is to say, the fingertip receives only the shearing force ft caused by the mechanical structure.

In response to the anticlockwise rotation of the rotary knob component 150, the temperature set to the air conditioner reaches the minimum temperature (for example, 18° C.) at a time T1. After the time T1, the user interface device 1 starts tactile presentation by the actuator 105 in response to anticlockwise rotation of the rotary knob component 150. Specifically, the user interface device 1 outputs a drive signal for vibrating the actuator 105 synchronously with rotation events successively occurring in response to the anticlockwise rotation of the rotary knob component 150 still continued after the time T1. As a result, a tactile stimulus such that the tactile stimulus generated by the vibration of the actuator 105 is superimposed onto the tactile stimulus generated by the structure of the knob device 15 is presented to the user.

The above-described example lowers the temperature setting of the air conditioner in accordance with the user's operation. The processing to raise the temperature setting of the air conditioner is almost the same as the processing to lower the temperature setting. The processing to raise the temperature setting is different from the processing to lower the temperature setting in the rotational direction of the rotary knob component 150 and referencing the upper limit in the temperature setting.

Specifically, in response to clockwise rotation of the rotary knob component 150, the temperature set to the air conditioner reaches the maximum temperature (for example, 30° C.) at a time T2. After the time T2, the user interface device 1 starts tactile presentation by the actuator 105 in response to clockwise rotation of the rotary knob component 150. Specifically, the user interface device 1 outputs a drive signal for vibrating the actuator 105 synchronously with rotation events successively occurring in response to the clockwise rotation of the rotary knob component 150 still continued after the time T2. As a result, a tactile stimulus such that the tactile stimulus generated by the vibration of the actuator 105 is superimposed onto the tactile stimulus generated by the structure of the knob device 15 is presented to the user.

In the foregoing example, the user interface device 1 withholds the vibration of the actuator 105 when the temperature set to the air conditioner is between the lower limit and the upper limit. In another example, the user interface device 1 can make the actuator 105 vibrate in a manner different from the one at the upper limit and the lower limit when the temperature is neither the upper limit nor the lower limit. For example, the amplitude or frequency of the drive pulse 331 can be made different or the drive pulse 331 can be provided with a phase difference from the mechanical tactile click. In still another example, the manners of vibration can be different between when the temperature is the upper limit and when the temperature is the lower limit.

Figure 13:
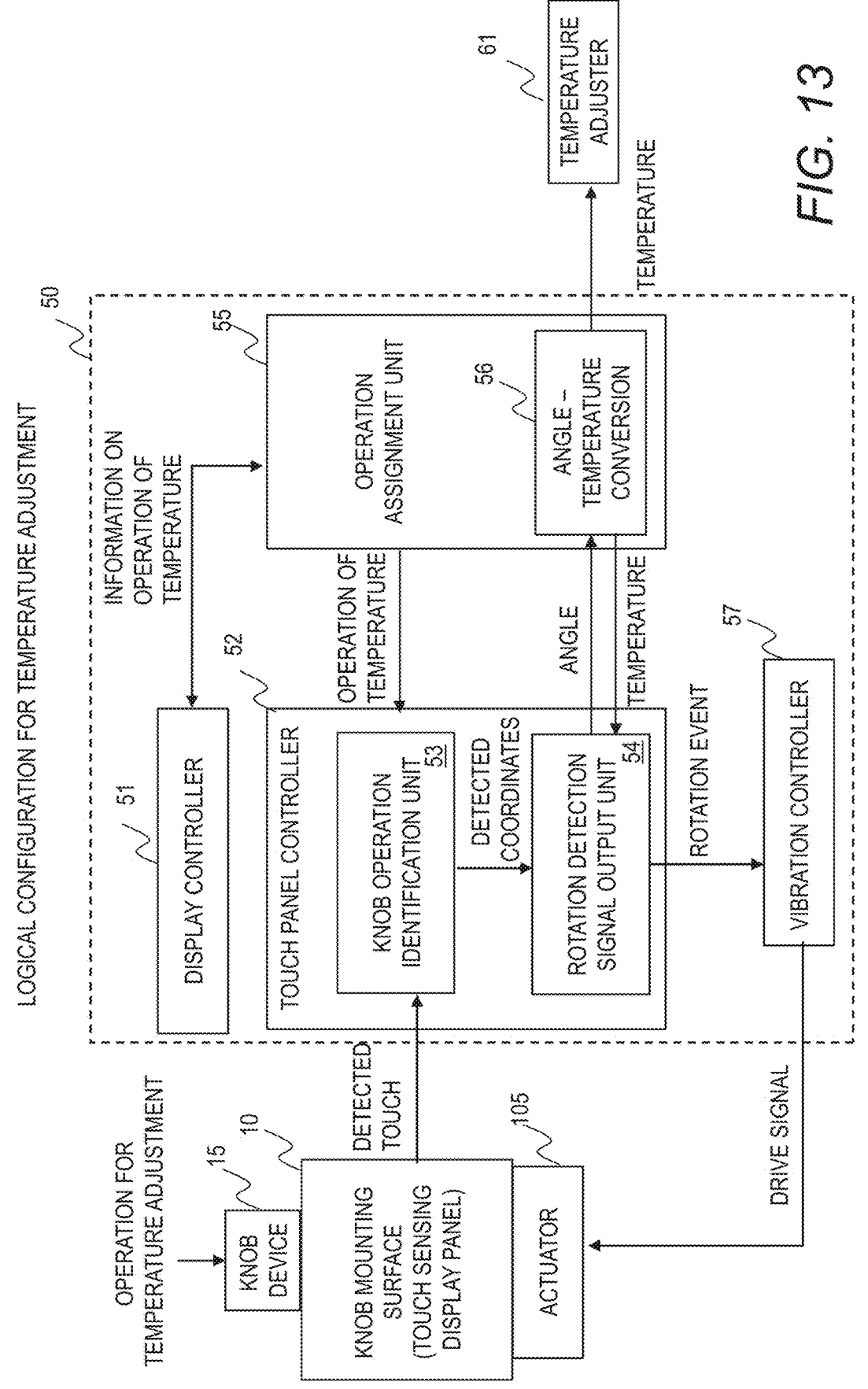
FIG. 13 illustrates an example of the logical configuration for executing the processing to lower the temperature setting of the air conditioner described with reference to FIGS. 11 and 12.

FIG. 13 illustrates an example of the logical configuration for executing the processing to lower the temperature setting of the air conditioner described with reference to FIGS. 11 and 12. The user interface device 1 includes a controller 50 in addition to the knob device 15, the touch sensing display panel 10, and the actuator 105. The controller 50 executes processing to be executed by the user interface device 1 while controlling other devices. In this example, the controller 50 instructs a temperature adjuster 61 of the temperature setting in accordance with the user's operation.

The controller 50 can include one or more arithmetic devices and one or more storage devices. Examples of the arithmetic device include a processor, a graphics processing unit (GPU), and a field programmable gate array (FPGA). The storage device stores programs and data to be used by the controller 50. The storage device can include a volatile or non-volatile memory. The storage device includes work areas to be used by the programs.

The controller 50 works as function units (modules) for controlling external devices including the touch sensing display panel 10, the actuator 105, and the temperature adjuster 61. In this example, the controller 50 works as a display controller 51, a touch panel controller 52, an operation assignment unit 55, and a vibration controller 57. The touch panel controller 52 includes a knob operation identification unit 53 and a rotation detection signal output unit 54.

The operation assignment unit 55 assigns a specific operation function to the user interface device 1 in response to a user's specific operation. In the example described with reference to FIGS. 11 and 12, the operation assignment unit 55 assigns an air conditioner temperature setting function to the user interface device 1. The display controller 51 generates a specific image in accordance with the assigned operation function and the user's operation and displays the image on the touch sensing display panel 10.

The touch panel controller 52 detects a touch point of the user and touch points of the plurality of conductor pieces 151 attached on the rotary knob component 150 (see FIG. 3) on the touch sensing display panel 10 and forwards the information acquired from the detection results to the operation assignment unit 55 and the vibration controller 57. Specifically, the knob operation identification unit 53 detects the touch points of the plurality of conductor pieces 151 attached on the rotary knob component 150.

The rotation detection signal output unit 54 calculates the angle of the rotary knob component 150 from the touch points of the plurality of conductor pieces 151 of the rotary knob component 150 and forwards the information to the operation assignment unit 55. The operation assignment unit 55 executes the angle—temperature conversion 56, determines the temperature to be set (the variation in temperature setting) in accordance with the angle (the variation in angle) of the rotary knob component 150, and informs the temperature adjuster 61 and the display controller 51 of it. The temperature adjuster 61 controls the air conditioner to adjust the room temperature to the specified temperature. The display controller 51 generates an image based on the specified temperature.

The rotation detection signal output unit 54 generates a rotation event pulse in response to a predetermined amount of rotation $\Delta\phi$ of the rotary knob component 150. As described above, the rotation event pulse generated in the rotation detection signal output unit 54 is synchronized with the predetermined amount of rotation $\Delta\phi$. Moreover, the rotation detection signal output unit 54 acquires information on the current temperature setting from the operation assignment unit 55.

The rotation detection signal output unit 54 outputs a rotation event pulse (rotation event signal) for controlling the actuator 105 to the vibration controller 57 when predetermined conditions are satisfied. In this example, the rotation detection signal output unit 54 outputs a rotation event pulse to the vibration controller 57 when the temperature setting has reached the lower limit or upper limit and the rotary knob component 150 rotates clockwise or anticlockwise. The rotation event pulse is synchronized with the predetermined amount of rotation $\Delta\phi$. The vibration controller 57 outputs a drive signal to the actuator 105 in accordance with the received rotation event pulse to make the actuator 105 vibrate.

Figure 14:
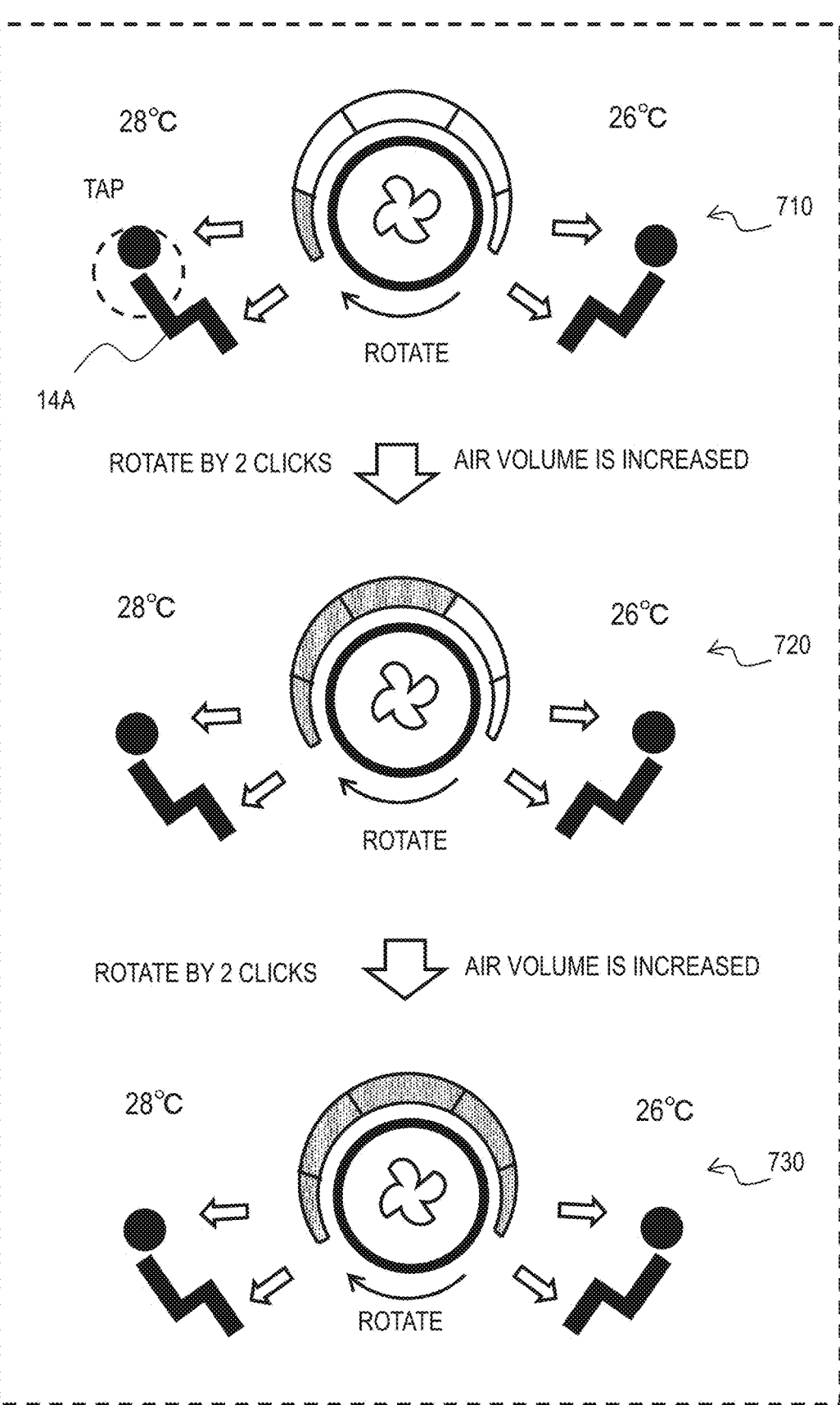
FIG. 14 illustrates operation to adjust the air volume setting of an air conditioner through the user interface device and resultant changes of the image displayed on the user interface device.

Next, an example of adjusting air volume setting of an air conditioner is described. FIG. 14 illustrates operation to adjust the air volume setting of an air conditioner through the user interface device 1 and resultant changes of the image displayed on the user interface device 1. The user interface device 1 is configured to change the air volume setting by one level when the knob device 15 generates one mechanical tactile click. Clockwise (rightward) rotation of the rotary knob component 150 increases the air volume and anticlockwise (leftward) rotation decreases the air volume.

When the user taps the displayed human image 14A on the left seat in the state 710 in FIG. 14, the knob device 15 is assigned a usage of adjusting the air volume setting of the air conditioner. For example, the user rotates the rotary knob component 150 clockwise. The user interface device 1 raises the air volume setting by one level when the knob device 15 generates one mechanical tactile click. The current air volume setting for the left seat is Level 1; clockwise rotation that generates two tactile clicks raises the air volume setting by two levels. The state 720 depicts the state where the air volume setting for the left seat is raised to Level 3.

The user further rotates the rotary knob component 150 clockwise from the state 720 where the air volume setting for the left seat is Level 3. The state of the user interface device 1 changes into the state 730 where the air volume setting for the left seat is raised to Level 5 (a maximum level).

Assume that the user further rotates the rotary knob component 150 clockwise after the air volume for the left seat is set at Level 5. The user interface device 1 drives the actuator 105 synchronously with a tactile click generated by the structure of the knob device 15. The unique tactile stimulus obtained by superimposing the tactile stimulus by the actuator 105 onto the tactile stimulus by the structure makes the user perceive that the air volume setting has reached the upper limit. The air volume setting for the left seat is maintained at Level 5.

For example, when the user rotates the rotary knob component 150 anticlockwise by one tactile click after perceiving the unique tactile stimulus, the air volume changes from Level 5 to Level 4. At this event, the vibration by the actuator 105 is not added. The user who knows that the air volume setting to cause the unique tactile stimulus is Level 5 can set a desired air volume without looking at the screen of the user interface device 1 based on the number of tactile clicks counted in rotating the knob anticlockwise.

Figure 15:
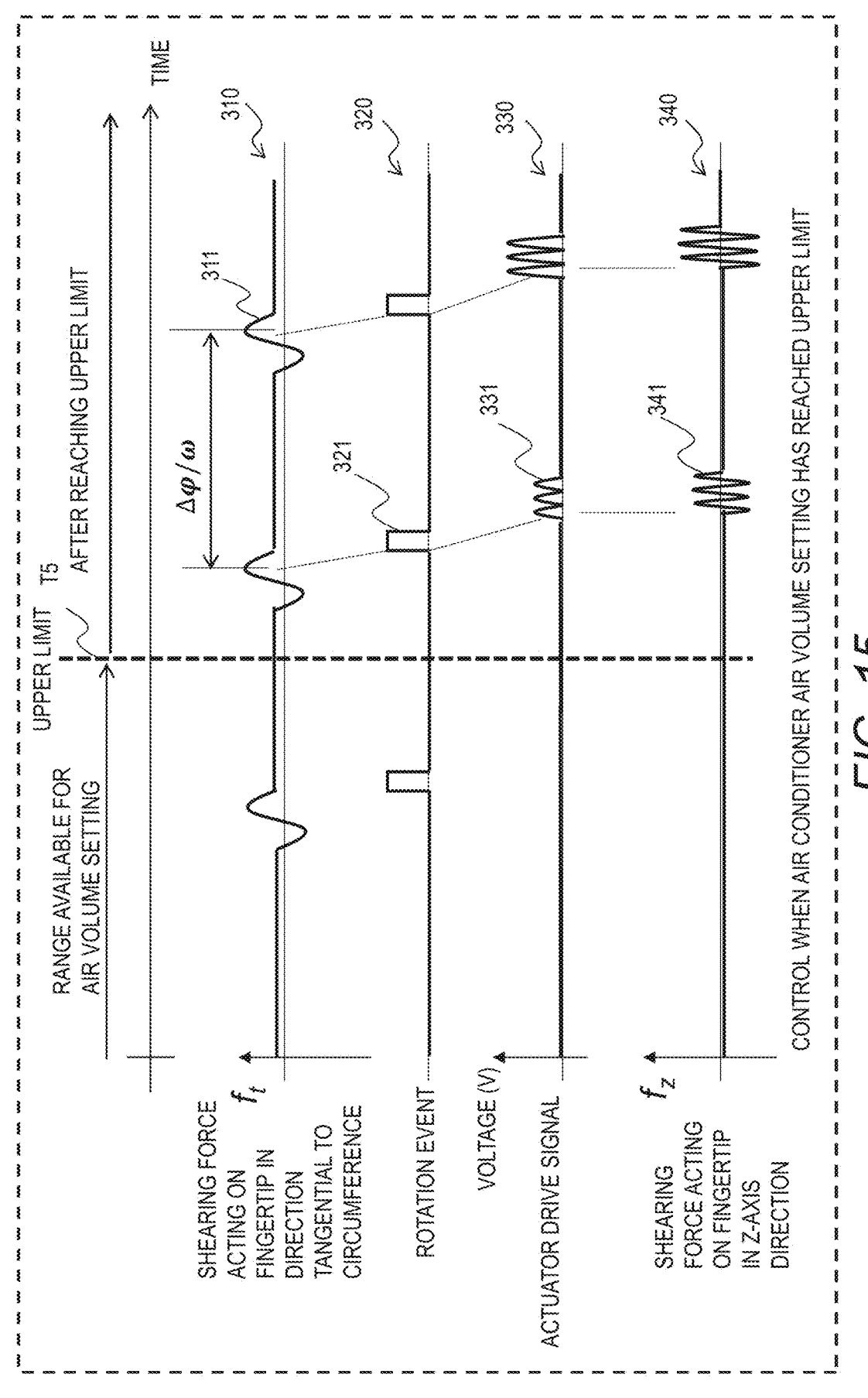
FIG. 15 is a diagram for explaining the behavior of the user interface device described with reference to FIG. 14.

FIG. 15 is a diagram for explaining the behavior of the user interface device 1 described with reference to FIG. 14. It is assumed that the user rotates the rotary knob component 150 clockwise at a constant angular velocity ω. Although it is assumed that the rotary knob component 150 is rotated at a constant angular velocity ω for convenience of explanation, the actual angular velocity can take any value.

The graph 310 represents temporal variation of the shearing force ft in a direction tangential to the circumference that is caused by the mechanical vibration generated by the rotation of the rotary knob component 150 at the angular velocity ω and acting on the fingertip. The graph 320 represents the rotation detection signal output in the user interface device 1 in response to rotation of the rotary knob component 150 in the amount of rotation Δφ to cause a cyclic tactile stimulus. The graph 330 represents the drive signal to be supplied to the actuator 105. The graph 340 represents the shearing force in the Z-axis direction that is caused by the movement of the actuator 105 and acting on the fingertip.

The user interface device 1 monitors the angular position of the rotary knob component 150 based on the positions of the plurality of conductor pieces 151 of the rotary knob component 150. When the rotary knob component 150 rotates clockwise by Δφ after the last time the air volume setting is raised, the user interface device 1 raises the air volume setting for the left seat by one level. Unless the air volume setting reaches the upper limit, the user interface device 1 keeps the actuator 105 not to vibrate. That is to say, the fingertip receives only the shearing force ft caused by the mechanical structure.

In response to the clockwise rotation of the rotary knob component 150, the air volume set to the air conditioner reaches the maximum air volume level (for example, Level 5) at a time T5. After the time T5, the user interface device 1 starts tactile presentation by the actuator 105 in response to clockwise rotation of the rotary knob component 150. Specifically, the user interface device 1 outputs a drive signal for vibrating the actuator 105 synchronously with rotation events successively occurring in response to the clockwise rotation of the rotary knob component 150 still continued after the time T5. As a result, a tactile stimulus such that the tactile stimulus generated by the vibration of the actuator 105 is superimposed onto the tactile stimulus generated by the structure of the knob device 15 is presented to the user.

The above-described example raises the air volume setting of the air conditioner in accordance with the user's operation. The processing to lower the air volume setting of the air conditioner is almost the same as the processing to raise the air volume setting. The processing to lower the air volume setting is different from the processing to raise the air volume setting in the rotational direction of the rotary knob component 150 and referencing the lower limit in the air volume setting.

Specifically, in response to anticlockwise rotation of the rotary knob component 150, the air volume set to the air conditioner reaches the minimum level (for example, Level 0) at a time T6. After the time T6, the user interface device 1 starts tactile presentation by the actuator 105 in response to anticlockwise rotation of the rotary knob component 150. Specifically, the user interface device 1 outputs a drive signal for vibrating the actuator 105 synchronously with rotation events successively occurring in response to the anticlockwise rotation of the rotary knob component 150 still continued after the time T6. As a result, a tactile stimulus such that the tactile stimulus generated by the vibration of the actuator 105 is superimposed onto the tactile stimulus generated by the structure of the knob device 15 is presented to the user.

In the foregoing example, the user interface device 1 withholds the vibration of the actuator 105 when the air volume set to the air conditioner is between the lower limit and the upper limit. In another example, the user interface device 1 can make the actuator 105 vibrate in a manner different from the one at the upper limit and the lower limit when the air volume is neither the upper limit nor the lower limit. For example, the amplitude or frequency of the drive pulse 331 can be made different or the drive pulse 331 can be provided with a phase difference from the mechanical tactile click. In still another example, the manners of vibration can be different between when the air volume is the upper limit and when the air volume is the lower limit.

Figure 16:
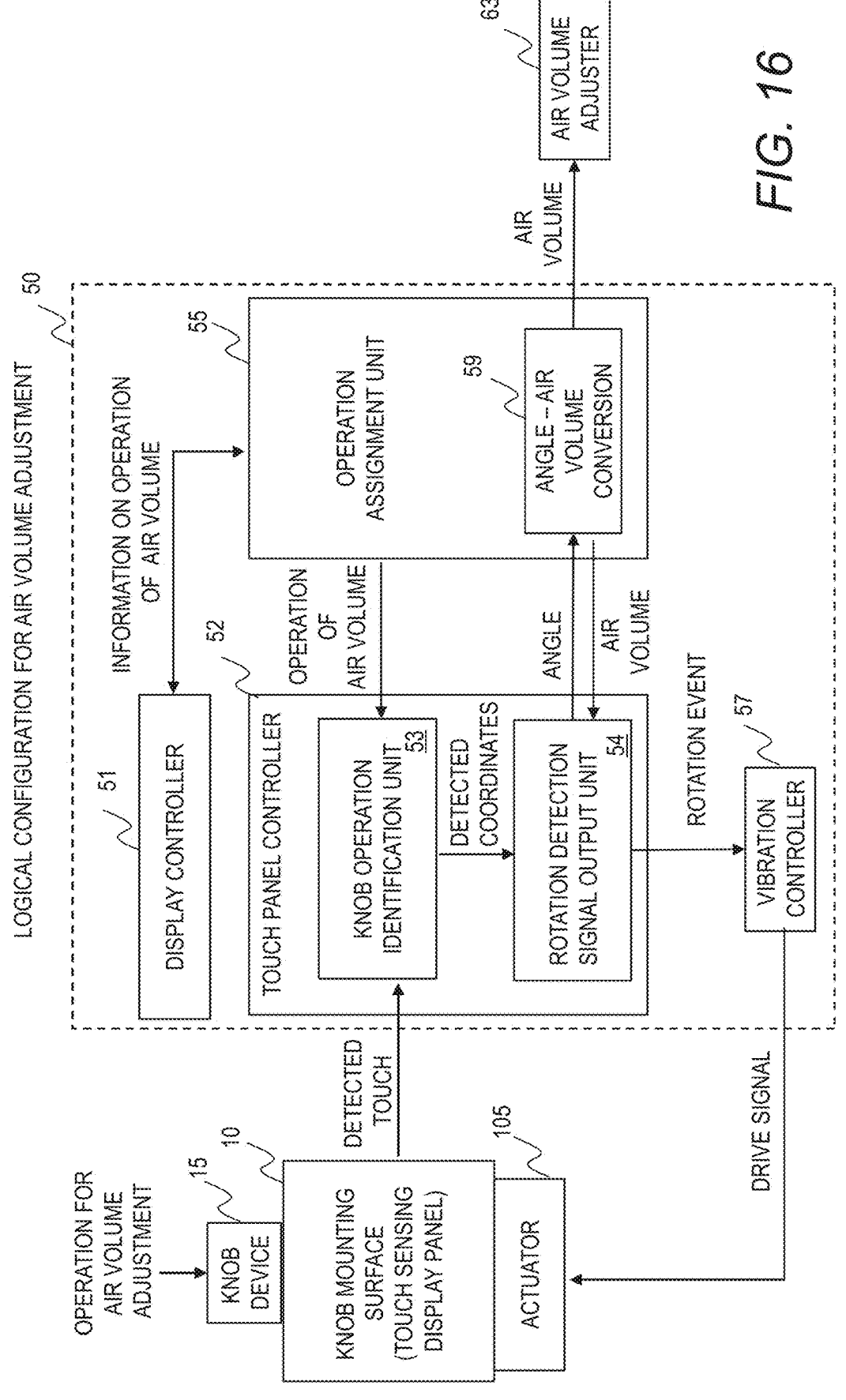
FIG. 16 illustrates an example of the logical configuration for executing the processing to raise the air volume setting of the air conditioner described with reference to FIGS. 14 and 15.

FIG. 16 illustrates an example of the logical configuration for executing the processing to raise the air volume setting of the air conditioner described with reference to FIGS. 14 and 15. The following mainly describes differences from the configuration example in FIG. 13. Compared to the logical configuration in FIG. 13, the processing of the operation assignment unit 55 is changed from angle—temperature conversion 56 to angle—air volume conversion 59 and the temperature adjuster 61 is replaced with an air volume adjuster 63.

In the example described with reference to FIGS. 14 and 15, the operation assignment unit 55 assigns an air conditioner air volume setting function to the user interface device 1. The display controller 51 generates a specific image in accordance with the assigned operation function and the user's operation and displays the image on the touch sensing display panel 10. The operation assignment unit 55 executes the angle—air volume conversion 59, determines the air volume to be set (the variation in air volume setting) in accordance with the angle (the variation in angle) of the rotary knob component 150, and informs the air volume adjuster 63 and the display controller 51 of it. The air volume adjuster 63 controls the air conditioner to adjust the air volume to the specified level. The display controller 51 generates an image based on the specified air volume.

The rotation detection signal output unit 54 generates a rotation event pulse in response to a predetermined amount of rotation Δφ of the rotary knob component 150. As described above, the rotation event pulse generated in the rotation detection signal output unit 54 is synchronized with the predetermined amount of rotation Δφ. Moreover, the rotation detection signal output unit 54 acquires information on the current air volume setting from the operation assignment unit 55.

The rotation detection signal output unit 54 outputs a rotation event pulse (rotation event signal) for controlling the actuator 105 to the vibration controller 57 when predetermined conditions are satisfied. In this example, the rotation detection signal output unit 54 outputs a rotation event pulse to the vibration controller 57 when the air volume setting has reached the lower limit or upper limit and the rotary knob component 150 rotates clockwise or anticlockwise. The rotation event pulse is synchronized with the predetermined amount of rotation Δφ. The vibration controller 57 outputs a drive signal to the actuator 105 in accordance with the received rotation event pulse to make the actuator 105 vibrate.

Like in the foregoing temperature setting adjustment and air volume setting adjustment, the controller 50 can be configured to supply a drive signal to the actuator 105 to make it vibrate only in the period where predetermined conditions are satisfied. Then, the user can know the current state without looking at the displayed image on the user interface device 1. The predetermined conditions can be determined differently for each function assigned to the knob device 15.

For a function to be assigned to the knob device 15, combinations of a range of the value to be varied by the user's operation and a direction of operation of the rotary knob component 150 are predetermined. The controller 50 makes the actuator 105 vibrate in response to operation of the rotary knob component 150 in the predetermined direction when the value to be varied is within the predetermined range.

In the foregoing examples, when the value to be varied, such as the temperature or the air volume, has reached the upper limit and the knob is operated in the direction to further increase the value or when the value to be varied has reached the lower limit and the knob is operated in the direction to further decrease the value, the controller 50 adds vibration by the actuator 105. The controller 50 can always make the actuator vibrate in the same manner in response to operation of the knob.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A user interface device comprising:
a knob device having a mechanical structure that presents a tactile stimulus in response to every predetermined amount of knob operation;
a panel on which the knob device is mounted;
a controller; and
a vibration generator configured to vibrate the knob device, the vibration generator being controllable by the controller,
wherein the controller controls the vibration generator to make the knob device vibrate synchronously with the predetermined amount of knob operation for the knob device to present a tactile stimulus in addition to the tactile stimulus by the mechanical structure.

2. The user interface device according to claim 1, wherein the vibration of the knob device synchronized with the predetermined amount of knob operation is generated at every predetermined amount of knob operation.

3. The user interface device according to claim 1, wherein a drive pulse for the vibration generator in order to make the knob device vibrate synchronously with the predetermined amount of knob operation consists of a plurality of isolated sine waves.

4. The user interface device according to claim 1, wherein the vibration generator includes an actuator mounted on the panel and driven by a drive signal.

5. The user interface device according to claim 1, wherein the vibration of the knob device caused by the vibration generator is generated only when a predetermined condition is satisfied.

6. The user interface device according to claim 5,
wherein the controller is configured to assign one function selected from a plurality of functions to the knob device,
wherein, for the selected one function, combinations of a range of a value to be adjusted by user operation and a direction of operation of the knob device are predetermined, and
wherein the controller is configured to make the vibration generator vibrate in response to operation of the knob device in the predetermined direction when the value to be varied is within the predetermined range.

7. The user interface device according to claim 5,
wherein the knob device is assigned a function to adjust temperature setting of an air conditioner,
wherein the controller is configured to make the vibration generator vibrate in response to either operation of the knob device to raise the temperature setting when the temperature setting has reached an upper limit or operation of the knob device to lower the temperature setting when the temperature setting has reached a lower limit.

8. A method of controlling tactile presentation of a user interface device including a knob device having a mechanical structure that presents a tactile stimulus in response to every predetermined amount of knob operation, a panel on which the knob device is mounted, and a vibration generator configured to vibrate the knob device, the method comprising:
controlling the vibration generator to make the knob device vibrate synchronously with the predetermined amount of knob operation for the knob device to present a tactile stimulus in addition to the tactile stimulus by the mechanical structure.

9. The user interface device according to claim 1,
wherein the vibration generator includes an actuator, and
wherein the controller is configured to synchronize the vibration generated by the actuator with a mechanical tactile click of the knob device.

10. The user interface device according to claim 1,
wherein the vibration generator includes an actuator, and
wherein the controller is configured to output a drive pulse to the actuator each time a mechanical tactile click of the knob device occurs, such that vibration of the actuator is phase-aligned with the timing of the mechanical tactile click of the knob device.

11. The user interface device according to claim 1,
wherein the vibration generator includes an actuator, and
wherein the controller is configured to determine that the knob device has reached a lower limit or an upper limit of an adjustable range, and output a vibration pulse synchronized with a mechanical tactile click of the knob device at a position of the reached lower or upper limit to notify the user of the boundary.

12. The user interface device according to claim 1,
wherein the vibration generator is disposed on a surface of the panel opposite a surface on which the knob device is mounted.

* * * * *